(12) United States Patent
Herring et al.

(10) Patent No.: US 10,789,811 B2
(45) Date of Patent: *Sep. 29, 2020

(54) COMPUTING SYSTEM PROVIDING A USER-DIRECTED, AVATAR-BASED SKILL ACTIVITY

(71) Applicant: Chill Gaming Pty Ltd, Southbank VIC (AU)

(72) Inventors: Peter James Herring, Box Hill South (AU); Joseph Ronald Crepaldi, Potts Point (AU); Andrew Wyer, Glen Iris (AU); Daryl Bridges, Selby (AU); Daryl Leigh Bruce, Croydon South (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/607,370

(22) Filed: May 26, 2017

(65) Prior Publication Data

US 2017/0337776 A1 Nov. 23, 2017

Related U.S. Application Data

(63) Continuation-in-part of application No. PCT/AU2017/050206, filed on Mar. 8, 2017.
(Continued)

(30) Foreign Application Priority Data

Mar. 8, 2016 (AU) ................................ 2016900870
May 3, 2016 (AU) ................................ 2016901624

(51) Int. Cl.
G07F 17/32 (2006.01)
A63F 13/45 (2014.01)
(Continued)

(52) U.S. Cl.
CPC .......... *G07F 17/3267* (2013.01); *A63F 13/20* (2014.09); *A63F 13/2145* (2014.09);
(Continued)

(58) Field of Classification Search
CPC ............. G07F 17/3225; G07F 17/3267; G07F 17/3209; G07F 17/3213; G07F 17/3246;
(Continued)

(56) References Cited

U.S. PATENT DOCUMENTS

| 3,557,324 A | 1/1971 | Nakamatsu |
| 4,214,298 A | 7/1980 | Propst et al. |

(Continued)

FOREIGN PATENT DOCUMENTS

| EP | 1041538 | 12/2006 |
| WO | WO 2013/184860 | 12/2013 |

OTHER PUBLICATIONS

International Search Report and Written Opinion in International Application No. PCT/AU2017/050795, Notification dated Oct. 10, 2017.

*Primary Examiner* — Malina D. Blaise
(74) *Attorney, Agent, or Firm* — Knobbe Martens Olson & Bear LLP

(57) ABSTRACT

Described embodiments generally relate to a computing system including a virtual environment hosting a player avatar comprising: a display; a memory storing a set of activity instructions; at least one input mechanism configured to receive user input from a player. The controller is configured to access and execute the instructions stored in the memory to: generate a virtual environment; present a player avatar on the within the virtual environment; present at least one skill activity on the display; enable a player to control the player avatar to perform the game of skill activity in association with the virtual environment by operating the (Continued)

at least one input mechanism; in response to a triggering event, determine a skill score based on at least one aspect of the avatar's performance in the skill activity and the set of activity instructions; and based on the skill score, determine whether to electronically allocate a virtual good for use in association with the player avatar.

18 Claims, 19 Drawing Sheets

Related U.S. Application Data

(60) Provisional application No. 62/344,915, filed on Jun. 2, 2016.

(51) Int. Cl.
| | |
|---|---|
| *A63F 13/2145* | (2014.01) |
| *A63F 13/25* | (2014.01) |
| *A63F 13/35* | (2014.01) |
| *A63F 13/40* | (2014.01) |
| *A63F 13/52* | (2014.01) |
| *A63F 13/20* | (2014.01) |
| *A63F 13/79* | (2014.01) |
| *G07F 17/34* | (2006.01) |

(52) U.S. Cl.
CPC ............. *A63F 13/25* (2014.09); *A63F 13/35* (2014.09); *A63F 13/40* (2014.09); *A63F 13/45* (2014.09); *A63F 13/52* (2014.09); *A63F 13/79* (2014.09); *G07F 17/3209* (2013.01); *G07F 17/3213* (2013.01); *G07F 17/3225* (2013.01); *G07F 17/3246* (2013.01); *G07F 17/3248* (2013.01); *G07F 17/3258* (2013.01); *G07F 17/3269* (2013.01); *G07F 17/3288* (2013.01); *G07F 17/3295* (2013.01); *G07F 17/34* (2013.01)

(58) Field of Classification Search
CPC ............ G07F 17/3248; G07F 17/3258; G07F 17/3269; G07F 17/3288; G07F 17/3295; G07F 17/34; A63F 1/00; A63F 13/20; A63F 13/2145; A63F 13/25; A63F 13/35; A63F 13/40; A63F 13/45; A63F 13/52; A63F 13/79
USPC .......................................................... 463/10
See application file for complete search history.

(56) References Cited

U.S. PATENT DOCUMENTS

| | | | |
|---|---|---|---|
| 4,998,283 A | 3/1991 | Nishida et al. | |
| 5,119,429 A | 6/1992 | Chatelain | |
| 5,274,709 A | 12/1993 | Koizumi | |
| 5,452,025 A | 9/1995 | Koizumi | |
| 5,524,062 A | 6/1996 | Oh | |
| 5,710,394 A | 1/1998 | Saito et al. | |
| 5,821,471 A | 10/1998 | McCuller | |
| 5,898,137 A | 4/1999 | Saito | |
| 6,035,051 A | 3/2000 | Sato | |
| 6,298,942 B1 | 10/2001 | Schlatmann et al. | |
| 6,324,052 B1 | 11/2001 | Azima et al. | |
| 6,335,974 B1 | 1/2002 | Kunimoto | |
| 6,468,162 B1 | 10/2002 | Nakamura | |
| 7,471,804 B2 | 12/2008 | Lee | |
| 8,282,489 B2 | 10/2012 | Arezina et al. | |
| 8,702,521 B2 | 4/2014 | Wilm | |
| 9,486,704 B2* | 11/2016 | Nguyen | G07F 17/3225 |
| 9,685,038 B2 | 6/2017 | Mikoshiba et al. | |
| 2003/0235320 A1 | 12/2003 | Hirschhorn | |
| 2004/0053699 A1 | 3/2004 | Rasmussen et al. | |
| 2004/0152521 A1 | 8/2004 | Shinoda | |
| 2004/0166913 A1 | 8/2004 | Shinoda | |
| 2005/0047617 A1 | 3/2005 | Lee | |
| 2006/0093133 A1 | 5/2006 | Park et al. | |
| 2007/0223763 A1 | 9/2007 | Bienek et al. | |
| 2007/0259713 A1* | 11/2007 | Fiden | G07F 17/32 463/25 |
| 2007/0274547 A1 | 11/2007 | Ueno | |
| 2009/0034759 A1 | 2/2009 | Ko et al. | |
| 2009/0270168 A1 | 10/2009 | Englman et al. | |
| 2010/0210364 A1* | 8/2010 | York | A63F 13/12 463/43 |
| 2010/0248818 A1* | 9/2010 | Aoki | G07F 17/3267 463/25 |
| 2011/0143834 A1* | 6/2011 | Guinn | G07F 17/3281 463/25 |
| 2011/0212766 A1* | 9/2011 | Bowers | G07F 17/32 463/25 |
| 2011/0244935 A1 | 10/2011 | Matthews et al. | |
| 2011/0244952 A1* | 10/2011 | Schueller | G07F 17/3262 463/27 |
| 2012/0115580 A1* | 5/2012 | Hornik | G07F 17/3258 463/25 |
| 2012/0115593 A1 | 5/2012 | Vann et al. | |
| 2012/0115594 A1* | 5/2012 | Hornik | G07F 17/3258 463/27 |
| 2012/0322564 A1 | 12/2012 | Granger et al. | |
| 2013/0016864 A1 | 1/2013 | Ivey et al. | |
| 2014/0093114 A1 | 4/2014 | Nguyen et al. | |
| 2014/0269207 A1 | 9/2014 | Baym et al. | |
| 2014/0269214 A1 | 9/2014 | Baym et al. | |
| 2014/0328491 A1 | 11/2014 | Slotte | |
| 2014/0378195 A1* | 12/2014 | Lee | G07F 17/3276 463/7 |
| 2015/0287264 A1* | 10/2015 | De Viveiros Ortiz | G07F 17/3295 463/25 |
| 2016/0171827 A1* | 6/2016 | Washington | A63F 13/822 463/22 |
| 2016/0171835 A1* | 6/2016 | Washington | A63F 13/822 463/25 |
| 2016/0240037 A1* | 8/2016 | Robbins | G07F 17/3225 |
| 2017/0046921 A1* | 2/2017 | Bennett | G07F 17/3241 |
| 2017/0333785 A1 | 11/2017 | Herring et al. | |
| 2017/0333793 A1 | 11/2017 | Herring et al. | |
| 2018/0160219 A1 | 6/2018 | Englert | |
| 2018/0310095 A1 | 10/2018 | Wyer et al. | |
| 2019/0180553 A1 | 2/2019 | Herring et al. | |

* cited by examiner

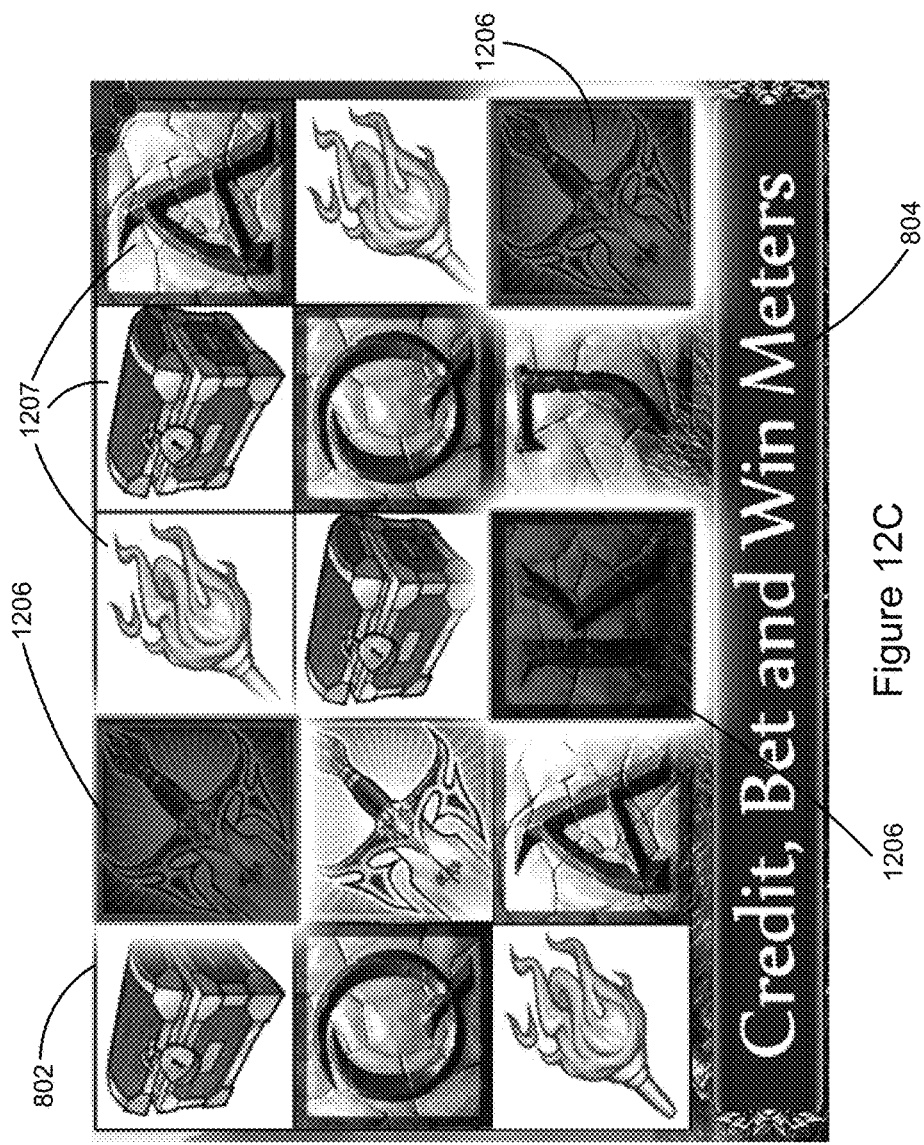
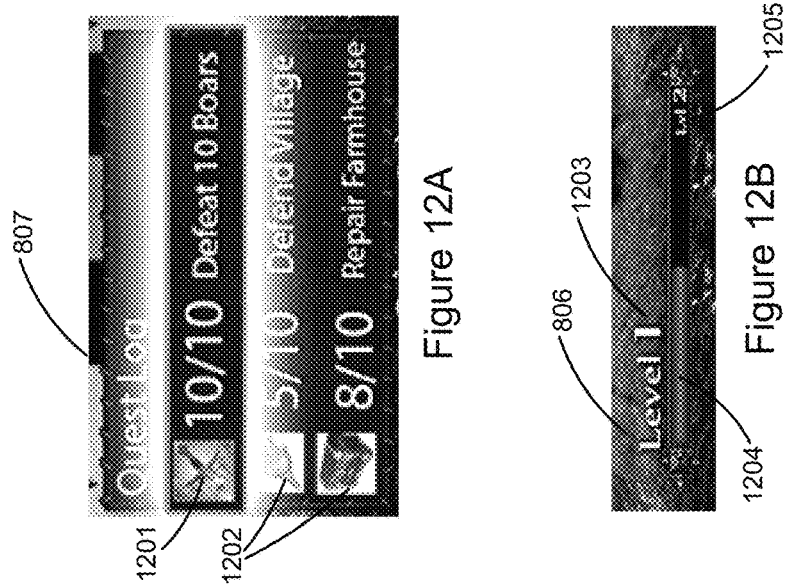
Figure 12C
Figure 12A
Figure 12B

COMPUTING SYSTEM PROVIDING A USER-DIRECTED, AVATAR-BASED SKILL ACTIVITY

CROSS-REFERENCE TO RELATED APPLICATIONS

The present application claims priority from U.S. Provisional Patent Application Ser. No. 62/344,915 filed on 2 Jun. 2016 and entitled "Gaming system and method comprising a skill score", the entire contents of which is hereby incorporated by reference, and is a continuation-in-part of International Patent Application No. PCT/AU2017/050206, filed on 8 Mar. 2017 and entitled "Gaming method, system and machine comprising multiple games", the entire contents of which is also hereby incorporated by reference. PCT/AU2017/050206 claims the benefit of Australian Provisional Patent Application No. 2016900870 filed 8 Mar. 2016, and Australian Provisional Patent Application No. 2016901624 filed 3 May 2016, the entire contents of both of which are hereby incorporated by reference.

TECHNICAL FIELD

The present disclosure relates to an improved system and an improved method, system and machine for providing user-directed computer-based activities.

BACKGROUND

Some systems reward users based on chance. However, such systems have limited appeal to some users.

It is desired to address or ameliorate one or more shortcomings or disadvantages associated with prior methods, systems and machines, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a computing system including a virtual environment hosting a player avatar comprising:
  a display;
  a memory storing a set of game instructions;
  at least one input mechanism configured to receive user input from a player; and
  a game controller configured to access and execute the instructions stored in the memory to:
  generate a virtual environment;
  present a player avatar on the display within the virtual environment;
  present at least one game of skill on the display;
  enable a player to control the player avatar to perform the game of skill in association with the virtual environment by operating the at least one input mechanism;
  in response to a triggering event, determine a skill score based on at least one aspect of the avatar's performance in the game of skill and the set of game instructions; and
  based on the skill score, determine whether to electronically allocate a virtual good for use in association with the player avatar.

Some embodiments relate to a gaming machine comprising:
  a display;
  a memory storing a set of game instructions;
  at least one input mechanism configured to receive user input from a player; and
  a game controller configured to access and execute the instructions stored in the memory to:
  present at least one game of skill on the display;
  enable a player to control an avatar to perform the game of skill by controlling the at least one input mechanism;
  in response to a triggering event, determine a skill score based on at least one aspect of the avatar's performance in the game of skill and the set of game instructions; and
  based on the skill score, determine a monetary reward to be awarded to the player from a prize pool.

According to some embodiments, the game controller is configured to present at least one game of chance on the display in response to receiving user input. In some embodiments, the at least one prize pool is incremented based on player spend in the game of chance.

In some embodiments, the game controller is configured to present the at least one game of skill after presenting the at least one game of chance. According to some embodiments, the game controller is configured to present the at least one game of skill in response to at least one outcome of the at least one game of chance.

In some embodiments, the game controller is configured to execute a meta-game, wherein the meta-game defines at least one meta-game objective and wherein progression through the meta-game towards the at least one meta-game objective is related to results of the game of chance. According to some embodiments, achievement of the at least one meta-game objective affects at least one aspect of the at least one game of skill.

According to some embodiments, the game controller is configured to present the at least one game of skill in response to a pre-determined condition being met.

According to some embodiments, the game controller is configured to present a selectable option to the user, wherein selecting the option causes the gaming controller to present the at least one game of skill. In some embodiments, the game controller is configured to present the selectable option to the user in response to a pre-determined condition being met.

In some embodiments, the monetary reward is determined based on a correlation between the skill score and a skill score range associated with the at least one prize pool.

According to some embodiments, the game controller is configured to randomly generate a return-to-player levelling event that causes the player who is playing at the time of the levelling event being generated to be awarded a pre-determined percentage of one or more prize pools associated with the skill based game. According to some embodiments, the return-to-player levelling event is generated before play of the game of skill commences. According to some embodiments, the percentage is between 60% and 100%. In some embodiments, the percentage is 100%.

According to some embodiments, the at least one prize pool is divided into a plurality of prize pool segments, each prize pool segment being associated with a skill score range. In some embodiments, the value of each prize pool segment is related to the skill score range associated with that prize pool segment.

In some embodiments, when a prize pool segment is won, that prize pool segment is reseeded with money from a secondary prize pool, and the associations between each prize pool and each skill score range are modified so that the monetary value of each prize pool segment is related to the skill score range associated with that prize pool segment.

According to some embodiments, the monetary reward awarded to the player is a percentage of an amount of money in a prize pool, the game controller configured to calculate the percentage based on the skill score. In some embodiments, the skill score is determined based on the actions of the avatar in the game of skill.

According to some embodiments, the skill score is determined based at least in part on a number of in-game items collected by the player in the skill based game. According to some embodiments, the skill score is determined based at least in part on a number of in-game opponents defeated by the player in the skill based game. According to some embodiments, the skill score is determined based at least in part on a time in which a player completes a task in the skill based game. According to some embodiments, the skill score is determined based at least in part on by a difficulty of an action sequence executed by the player in the skill based game. According to some embodiments, the skill score is determined based at least in part on an amount of damage inflicted upon an opponent by the player in the skill based game. According to some embodiments, the skill score is determined based at least in part on the use of in-game consumables by the player in the skill based game. According to some embodiments, the skill score is determined based at least in part on an amount of damage inflicted upon the player in the skill based game.

In some embodiments, the game controller is further configured to, based on the skill score, determine a non-monetary reward to be awarded to the player.

According to some embodiments, wherein the triggering event is an action or achievement of the avatar during game play. In some embodiments, the triggering event is the completion of the feature game.

Some embodiments relate to a method of determining a monetary reward based on an outcome of a game of skill, the method comprising:
  presenting at least one game of skill on a display of a gaming machine;
  enabling a player to control an avatar to perform the game of skill by controlling at least one input mechanism;
  in response to a triggering event, determining a skill score based on at least one aspect of the avatar's performance in the game of skill and a set of game instructions stored in a memory of the gaming machine; and
  based on the skill score, determining a monetary reward to be awarded to the player from a prize pool.

Some embodiments further comprise presenting at least one game of chance on the display in response to receiving user input. Some embodiments further comprise incrementing the prize pool based on player spend in the game of chance.

Some embodiments further comprise presenting the at least one game of skill after presenting the at least one game of chance. Some embodiments further comprise presenting the at least one game of skill in response to at least one outcome of the at least one game of chance.

Some embodiments further comprise executing a meta-game, wherein the meta-game defines at least one meta-game objective and wherein progression through the meta-game towards the at least one meta-game objective is related to results of the game of chance.

Some embodiments relate to a computer-readable medium storing machine-readable instructions, which when executed by a processor, causes the processor to perform the method of some other embodiments.

Some embodiments relate to a gaming machine comprising:
  a display;
  a memory storing a set of game instructions;
  at least one input mechanism configured to receive user input from a player; and
  a game controller configured to access and execute the instructions stored in the memory to:
  present at least one game of skill on the display;
  enable a player to control an avatar to perform the game of skill by operating the at least one input mechanism;
  in response to a triggering event, determine a skill indicator based on at least one aspect of the avatar's performance in the game of skill and the set of game instructions; and
  based on the skill indicator, determine a monetary reward to be awarded to the player from a prize pool.

BRIEF DESCRIPTION OF DRAWINGS

Embodiments are described below in further detail and by way of example, with reference to the accompanying drawing, in which:

FIG. 12A is an example screenshot of a meta-game task screen showing a task being completed;

FIG. 12B is a detailed view of an example player level bar portion of the base game screen;

FIG. 12C is an example screenshot of the base game screen highlighting a winning meta-game combination;

DESCRIPTION OF EMBODIMENTS

Figure 1:
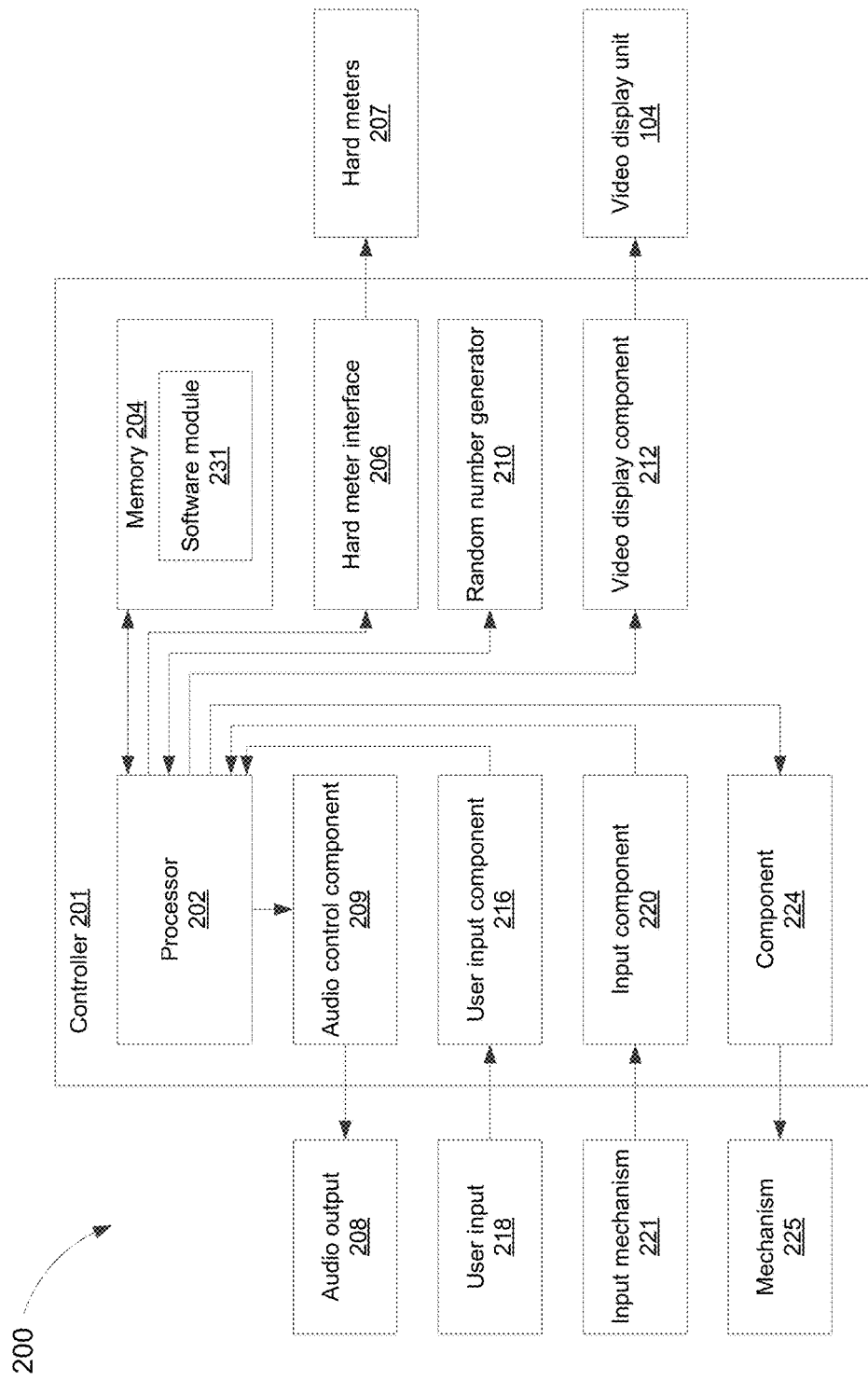
FIG. 1 is a schematic block diagram of core components of the gaming system of FIG. 2.

Described embodiments generally relate to a gaming machine. The gaming system can take a number of different forms. In a first form, a stand-alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on.

Reel-style gaming machines allow players to make bets on symbols that appear on the real or virtual reels, offering awards to players based on the combinations of symbols that appear. These games appeal to players as a way of winning cash or credits. However, reel-style games have limited appeal to some players.

It is desired to address or ameliorate one or more shortcomings or disadvantages associated with prior methods, systems and machines for gaming, or to at least provide a useful alternative thereto.

Irrespective of the form, the gaming system 100 has several core components. At the broadest level, the core components comprise a player interface and a game controller. The player interface is arranged to enable interaction between a player and the gaming system and for this purpose includes input/output components required for the player to enter instructions and play the game. For example, the input/output components may include a credit mechanism to enable a player to input credits and receive payouts, one or more displays which may comprise a touch screen, and a game play mechanism arranged to enable a player to input game playing instructions. The game controller is in data communication with the player interface and typically comprises a processor arranged to process game play instructions and output game player outcomes to the one or more displays. It will be understood that in the present specification, the term "processor" refers generally to any device that can process game play instructions and may include a microprocessor, microcontroller, programmable logic device or any computational device such as a personal computer or a server.

Figure 2:
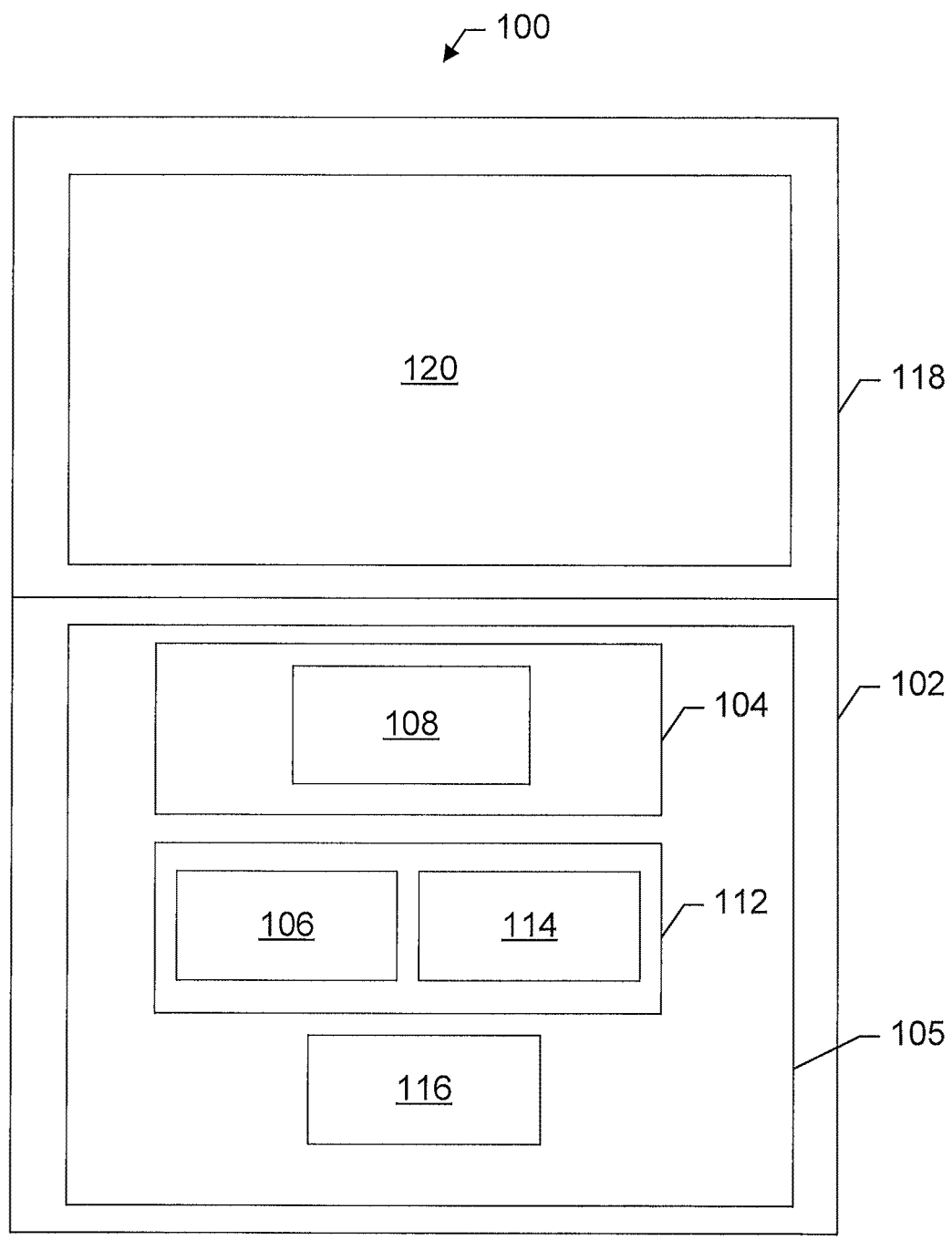
FIG. 2 is a diagrammatic representation of a gaming system in accordance with some embodiments, implemented in the form of a stand-alone gaming machine.

Referring now to FIG. 2, reference numeral 100 generally designates a stand-alone gaming system including a game. Hereinafter, the stand-alone gaming system 100 will be referred to as a gaming machine.

The gaming machine 100 includes a console 102 which contains all or most components required to implement a game play whereby, at least during part of the game play, a player wins or loses a wager. Access to the components is by way of a hinged door 105. Mounted to the exterior of the console 102 is a display means in the form of at least one visual display unit 104 on which one or more games is played. The video display unit 104 may be implemented as a liquid crystal display, a plasma screen, or other high quality digital video display. While the console 102 illustrated in FIG. 2 shows a single visual display unit 104, there may be more than one visual display unit on a gaming machine 100. For example, in some embodiments, gaming machine 100 may have one visual display unit 104 for displaying the game being played, and an additional visual display unit in the form of artwork 120 (described below) for displaying advertising or other material. In some embodiments, the additional visual display unit may be a video display unit. What is displayed on the visual display unit 104 will depend on what the intended goal of the unit is in relation to the player and any other potential participants in the gaming system. In some embodiments, a plurality of gaming machines 100 may communicate with a central display screen (not shown), which may allow for portions of gameplay to be displayed to a wider audience in a gaming venue.

In this example, the gaming machine 100 includes a tactile input for a player to interact via touch with the gaming machine 100. The tactile input may be in the form of a combination of pushbuttons 106 and a touch screen 108 for enabling a player to play one or more games. The touch screen 108 is an electronic visual display that can detect the presence and location of a touch within the display area. The touch screen 108 may be used during game setup, user browsing, or during the game play between start of a game and the end of a game, for example. Certain functions of the pushbutton are: initiation of game play, credit output, gameplay selection, completion of gameplay etc. A midtrim 112 of the machine 100 houses the pushbuttons 106.

The tactile input may optionally or further include a joystick (not shown) comprising a stick that pivots on a base and reports its angle or direction to the device it is controlling. The tactile input may optionally or further include a trackpad/touchpad (not shown) being a pointing device featuring a tactile sensor to translate the motion and position of a user's fingers to a relative position on screen. In some embodiments, tactile input may further include a keyboard, electronic mouse, or other input mechanism. In some embodiments, the user interface may be a user configurable interface having multiple user input options. It should be appreciated that tactile input may include any suitable device that enables the player to produce an input signal that is received by the processor 202 (see FIG. 1).

The midtrim 112 may house a credit input mechanism 221 including a bill collector 114. The credit input mechanism 221 may alternatively or additionally include a coin input chute, a card and/or ticket reader, a magnetic reading head for reading a magnetic stripe card, an electronic reader for a proximity card, a near field communications reader or any other form of electronic, wireless or contact that can input credit to the gaming machine.

A payout mechanism 225 including a coin tray 116 may be mounted beneath the console 102 and is provided for cash or other payouts from the machine 100 to the player. A hopper device (not shown) is provided which dispenses coins, or tokens equal to the amount of credit currently on the machine, into the coin tray 116. Aside from the coin tray 116, payout mechanism 225 may alternatively or additionally include a ticket dispenser for issuing a ticket dispensed by a printer which the user can redeem for cash, a note dispenser, a near field communications transmitter or means to enable remote credit transfer. Other suitable payout mechanisms, such as fund transfers to the player's electronically recordable identification card or smart card, may be implemented in accordance with described embodiments.

The gaming machine 100 includes a top box 118 on which artwork 120 or other images may be carried in the form of electronic visual display units. The artwork 120 could also comprise physical materials such as paper, plastic banners or posters. The artwork 120 may have generic information related to the machine or gaming system or the artwork 120 may be specifically made for a particular game to be played on the machine 100. While the artwork 120 is shown as being carried on the top box 118, the art work 120 can also be positioned in or on the bottom panel of the door 105, or any other part of the gaming machine 100 visible to the player. In some embodiments, artwork 120 may be a second digital display, which may show jackpot information, for example, or other supplemental video.

The gaming machine 100 further includes an auditory unit in the form of auditory output 208 (see FIG. 1) to provide auditory feedback to the player of the gaming machine 100.

Referring to FIG. 1, game logic circuitry 200 is illustrated. The game logic circuitry 200 includes a gaming controller 201 (otherwise referred to as a logic cage). As will be appreciated by those skilled in the gaming industry, the logic cage 201 includes a box-like mechanical structure that has slots to guide logic cards into the proper location for electronically plugging into a backplane mounted at the rear of the cage structure. The logic cards may contain hardware configured to perform specific functions, and may include sound cards, video cards, network cards, hard drives or other memory storage. The backplane has connectors for accepting mating connectors on the logic cards. The logic cage 201 and associated logic cards form one of the basic components of the gaming machine 100 and is securely housed within the cabinet of the gaming machine 100.

Central to the logic cage 201 is a processor 202 which may be a central processing unit, a microcontroller-based platform, a suitable integrated circuit, or one or more application-specific integrated circuits (ASIC's).

In this particular example, the processor 202 is in communication with or operable to access or to exchange signals with: memory 204, an audio control component 209, a hard meter interface 206, a random number generator 210, a user input component 216, a video display component 212, a credit input component 220 and a payout component 224.

Instructions and data to control operation of the processor 202 are stored in a memory 204 which is in data communication with processor 202. Memory 204 typically comprises both volatile and non-volatile memory and more than one of each type of memory. For example, the memory 204 may comprise RAM, ROM, and non-volatile memory in the form of a memory card, such as compact flash. RAM may include non-volatile RAM (NVRAM), magnetic RAM (MRAM), ferroelectric RAM (FeRAM), and other forms as commonly understood in the gaming industry. Memory 204 comprises a game software module 231 storing executable code, which when executed by the processor 202, provides the game on the gaming machine 100.

In particular, processor 202 runs executable code residing in game software module 231 of memory 204 that facilitates play of a game by a player through display unit 104 and/or push buttons 106 and touch sensors 108 mounted in the screen of display unit 104. Game software module 231 contains executable program code that defines the rules of the game, defines the sequence of gameplay, communicates with external systems, monitors peripheral equipment, and maintains integrity of the software code, among other things.

Audio control component 209 is in communication with audio output 208. Audio control component 209 may have its own digital signal processor, analogue to digital converters, amplifiers and other circuitry necessary to broadcast the output from the speakers.

Hard meter interface 206 communicates with hard meters 207. Hard meters 207 contain the gaming machine parameters which are required to be stored on a hard meter for regulatory reasons, which may include values such as total credit in and total credit out in some jurisdictions, for example. The values in hard meters 207 are only ever incremented, and cannot be reset or decremented.

Random number generator 210 generates random or pseudo-random numbers for the purpose of determining the outcome of chance-based games played on gaming machine 100, as well as for determining when a return-to-player levelling event is to occur for skill-based games played on gaming machine 100. While presenting a skill-based game on gaming machine 100 allows for increased player satisfaction by allowing players to exercise and improve their skill, awarding monetary prizes to players on a skill based game makes it difficult to regulate the return-to-player (RTP) amount awarded by the gaming machine. An RTP levelling event (as described in further detail below) allows the RTP to be maintained at the desired level, while allowing for a game of skill to be presented.

In some embodiments, random number generator 210 may be implemented in software as part of game software module 231. In some other embodiments, random number generator 210 may be implemented in firmware or in hardware. In some embodiments, the form that random number generator 231 takes may be dictated by gaming regulations.

User input component 216 communicates with user inputs 218, which may include pushbuttons 106 and touch screen sensors 108, among other inputs. Received inputs are decoded by user input component 216 and communicated to processor 202.

Video display component 212 communicates with video display unit 104. Processor 202 sends instructions to video display component 212, in order to cause images that make up the game sequence to be displayed on video display unit 104. These images may be pre-generated images retrieved by processor 202 from memory 204, or the images may be generated in real-time by processor 202 executing code modules stored in memory 204, as described below with reference to FIG. 4. In some embodiments, the displayed images may be made up of a pre-generated background retrieved from memory 204 in combination with an animated sequence generated in real-time by processor 202.

Credit input component 220 receives signals from credit input mechanism 221, which may include bill collector 114 in some embodiments. Credit input component 220 may use the signals to determine whether or not a player has provided sufficient credit to commence or continue gameplay, for example.

Payout component 224 communicates with payout mechanism 225, which may include coin tray 116. Payout component 224 may send instructions to payout mechanism 225, to cause payout mechanism 225 to dispense payment to a player. The payout may be in the form of cash, tokens or tickets in some embodiments. In some embodiments, the player may receive a code which they can use to collect their payout from a designated kiosk. In some embodiments, a player card or account may be credited with the payout amount. In some embodiments, a player may be able to finish game play and request a payout at various stages throughout the game. In some embodiments, players may be able to request a payout at any stage of the game. The player may be able to use user input 118 to request the payout.

According to some embodiments, payout component 224 may further be in communication with a prize pool meter 230. Prize pool meter 230 may be external to gaming controller 201, and may be external to gaming machine 100 in some embodiments. In some embodiments, prize pool meter 230 may be an allocated segment of memory 204, and may be stored as part of feature game prize data 408, as described in further detail below with reference to FIG. 4.

Prize pool meter 230 may store one or more prize pool values relating to the monetary amount that a player can win when playing gaming machine 100. According to some embodiments, prize pool meter 230 may further be in communication with credit input component 220, and one or more values stored in prize pool meter 230 may be incremented each time that gaming machine 100 accepts a wager from a player through credit input mechanism 221.

According to some embodiments, prize pool meter 230 may store one or more values relating to a multi-stage prize pool, and at least one value relating to a percentage based prize pool. When a winning event or payout occurs, one or more of the values stored in prize pool meter 230 may be decremented or set to zero, depending on the amount won by the player and paid out by payout mechanism 225. According to some embodiments, the player may win the entirety of the prize pool, in which case the prize pool meter may be reset to a start-up value, which may be zero or a non-zero value. On a winning event or payout event being determined by the processor 202, processor 202 may instruct payout component 224 to determine the amount to be paid out based on at least one value stored in prize pool meter 230, and a percentage or portion determined by processor 202. For example, processor 202 may instruct payout component 224 to payout 50% of a percentage based prize pool. Payout component 224 may be configured to determine the monetary amount that is equivalent to 50% of the value stored as the percentage based prize pool value in prize pool meter 230, and to pay out this value via payout mechanism 225. According to some embodiments, the percentage of a prize pool value to be paid out to a player may be determined by processor 202 based on a skill score achieved by the player in the feature game, as described in further detail below with reference to FIGS. 14 and 15.

In some embodiments, a player may insert an identification card or ticket into a card reader (not shown) of the gaming machine 100, in order to load information onto gaming machine 100. For example, the identification card or ticket may be associated with a player account containing credit, player settings, and player progress in a game. Such an identification card may be a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a mobile phone, a radio frequency identification tag, or any other suitable wireless device, that communicates a player's identification, credit totals (or related data), and other relevant information to the gaming device.

One or more of the method steps described in this disclosure may be implemented by game software module 231 stored in memory 204. Instructions stored in game software module 231 may be executed by processor 202 or any other processor. Further, the processor 202, the memory 204, the game software module 231 stored therein, or a combination thereof, may serve as a means for performing one or more of the method steps described herein.

Figure 3:
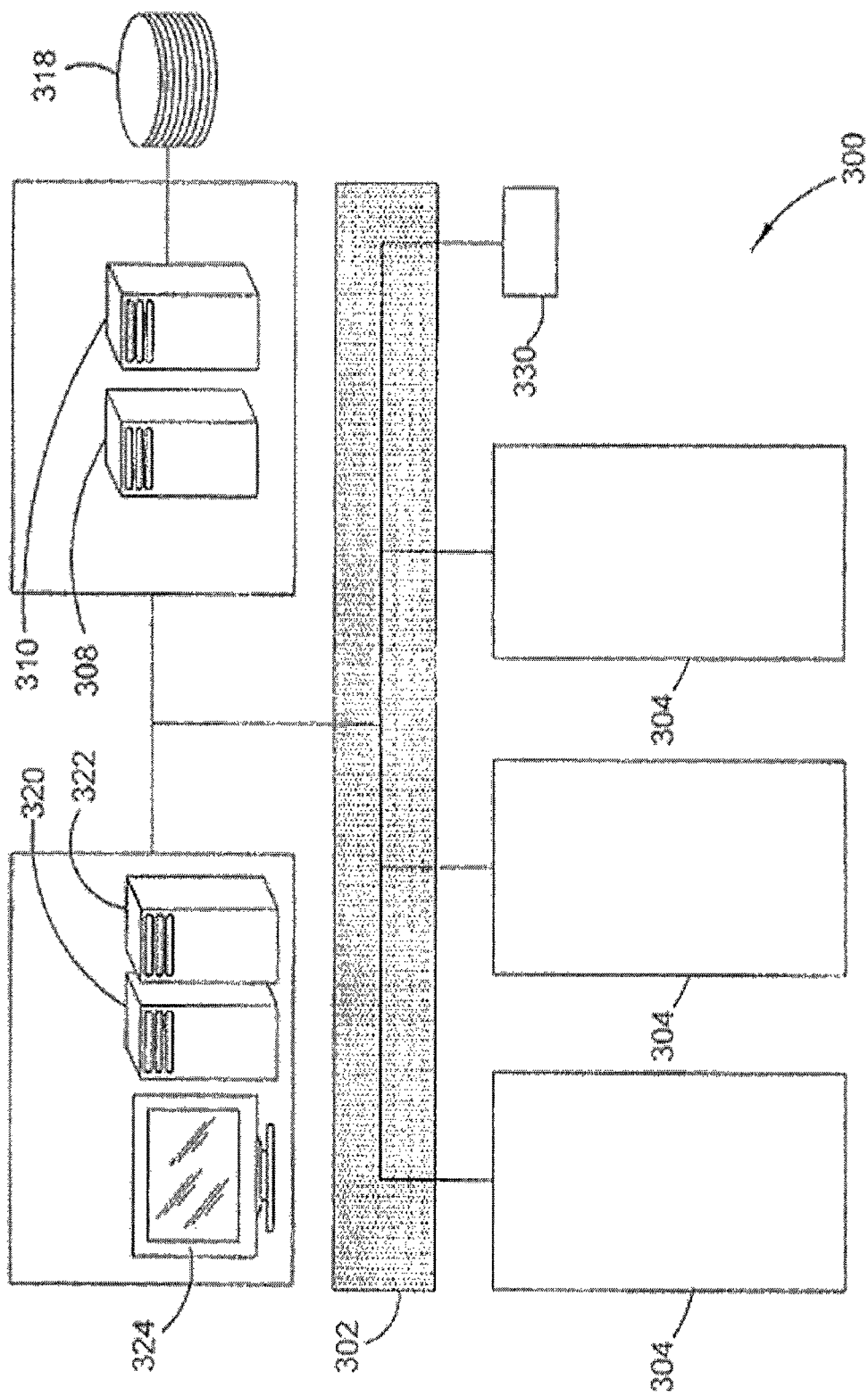
FIG. 3 is a schematic diagram of a gaming system in accordance with some embodiments, with the gaming system implemented over a network.

FIG. 3 shows a gaming system 300 in accordance with an alternative embodiment. The gaming system 300 includes a network 302, which for example may be or include an Ethernet, powerline, multimedia over Coax (MoCA), WiFi, or other type of network. The network 302 may also comprise a wide area network ("WAN"), the plain-old-telephone-system ("POTS"), a local area network ("LAN"), a wireless LAN, the Internet, or any combination of these and other types of networks. Gaming machines 304 are connected to the network 302. The gaming machines 304 provide a player operable interface and may be the same as the gaming machines 100 shown in FIG. 2 or may have simplified functionality depending on the requirements for implementing game play.

Gaming machines 304 may include game logic circuitry 200 as described above with reference to FIG. 1. Gaming machines 304 may further include a console similar to console 102 which contains all or most components required to implement a game play whereby, at least during part of the game play, a player wins or loses a wager. Access to the components may be by way of a hinged door, which may be similar to hinged door 105. Mounted to the exterior of the console may be a display means in the form of at least one visual display unit, which may be similar to display unit 104, on which one or more games is played. The display unit may be implemented as a liquid crystal display, a plasma screen, or other high quality digital video display. There may be more than one visual display unit on each gaming machine 304. For example, in some embodiments, gaming machines 304 may have one visual display unit for displaying the game being played, and an additional visual display unit in the form of artwork similar to artwork 120 (described below) for displaying advertising or other material. In some embodiments, the additional visual display unit may be a video display unit. What is displayed on the visual display unit will depend on what the intended goal of the unit is in relation to the player and any other potential participants in the gaming system. In some embodiments, a plurality of gaming machines 304 may communicate with a central display screen (not shown), which may allow for portions of gameplay to be displayed to a wider audience in a gaming venue.

Gaming machines 304 may include a tactile input for a player to interact via touch with the gaming machines 304. The tactile input may be in the form of a combination of pushbuttons and a touch screen similar to push-buttons 106 and a touch screen 108, for enabling a player to play one or more games. The touch screen may be an electronic visual display that can detect the presence and location of a touch within the display area. The touch screen may be used during game setup, user browsing, or during the game play between start of a game and the end of a game, for example. Certain functions of the push-button may include: initiation of game play, credit output, gameplay selection, completion of gameplay etc. A midtrim of the machine 304, similar to midtrim 112, may house the push-buttons.

The tactile input may optionally or further include a joystick comprising a stick that pivots on a base and reports its angle or direction to the device it is controlling. The tactile input may optionally or further include a trackpad/touchpad being a pointing device featuring a tactile sensor to translate the motion and position of a user's fingers to a relative position on screen. In some embodiments, tactile input may further include a keyboard, electronic mouse, or other input mechanism. In some embodiments, the user interface may be a user configurable interface having multiple user input options.

The midtrim of gaming machine 304 may house a credit input mechanism including a bill collector, similar to credit input mechanism 221 and bill collector 114. The credit input mechanism may alternatively or additionally include a coin input chute, a card and/or ticket reader, a magnetic reading head for reading a magnetic stripe card, an electronic reader for a proximity card, a near field communications reader or any other form of electronic, wireless or contact that can input credit to the gaming machine.

A payout mechanism including a coin tray, similar to payout mechanism 225 and coin tray 116, may be mounted beneath the console and may be provided for cash or other payouts from the machine 304 to the player. A hopper device may be provided which dispenses coins, or tokens equal to the amount of credit currently on the machine, into the coin tray. Aside from the coin tray, the payout mechanism may alternatively or additionally include a ticket dispenser for issuing a ticket dispensed by a printer which the user can redeem for cash, a note dispenser, a near field communications transmitter or means to enable remote credit transfer. Other suitable payout mechanisms, such as fund transfers to the player's electronically recordable identification card or smart card, may be implemented in accordance with described embodiments.

The gaming machine 304 may include a top box similar to top box 118 on which artwork similar to artwork 120 or other images may be carried in the form of electronic visual display units. The artwork could also comprise physical materials such as paper, plastic banners or posters. The artwork may have generic information related to the machine or gaming system or the artwork may be specifically made for a particular game to be played on the machine 304. While the artwork is shown as being carried on the top box, the art work can also be positioned in or on the bottom panel of the door, or any other part of the gaming machine 304 visible to the player. In some embodiments, the artwork may be a second digital display, which may show jackpot information, for example, or other supplemental video.

The gaming machines 304 further include an auditory unit in the form of auditory output 208 (see FIG. 1) to provide auditory feedback to the player of the gaming machine 304.

In a thick client embodiment, game server 308 implements part of the game played by a player using a gaming machine 304 and the gaming machine 304 implements part of the game. With this embodiment, as both the game server 308 and the gaming machine 100 implement part of the game, they collectively provide a game controller having similar functions to controller 201. A database management server 310 may manage storage of game programs and associated data for downloading or access by the gaming devices 304 in a database 318.

In a thin client embodiment, game server 308 implements most or all of the game played by a player using a gaming machine 304 and the gaming machine 304 essentially provides only the player interface. With this embodiment, the game server 308 provides the game controller. The gaming machine 304 will receive player instructions, pass these to the game server 305 which will process them and return game play outcomes to the gaming machine 304 for display. In a thin client embodiment, the gaming machines could be computer terminals, e.g. PCs running software that provides a player interface operable using standard computer input and output components.

Additional servers may be provided to assist in the administration of the gaming network 300, including for example a gaming floor management server 320, and a licensing server 322 to monitor the use of licenses relating to particular games. An administrator terminal 324 is provided to allow an administrator to run the network 302 and the devices connected to the network.

The gaming system 300 may communicate with other gaming systems, other local networks, for example a corporate network, and/or a wide area network such as the Internet, for example through a firewall 330.

In some embodiments, functionality at the server side of the network may be distributed over a plurality of different physical computers. For example, functional software elements may be run as a single "engine" on one server or a separate server may be provided. For example, the game server 308 could run a random number generator engine. Alternatively, a separate random number generator server could be provided. Further, in some embodiments a plurality of game servers could be provided to run different games or a single game server may run a plurality of different games as required by game machines 304.

Figure 4:
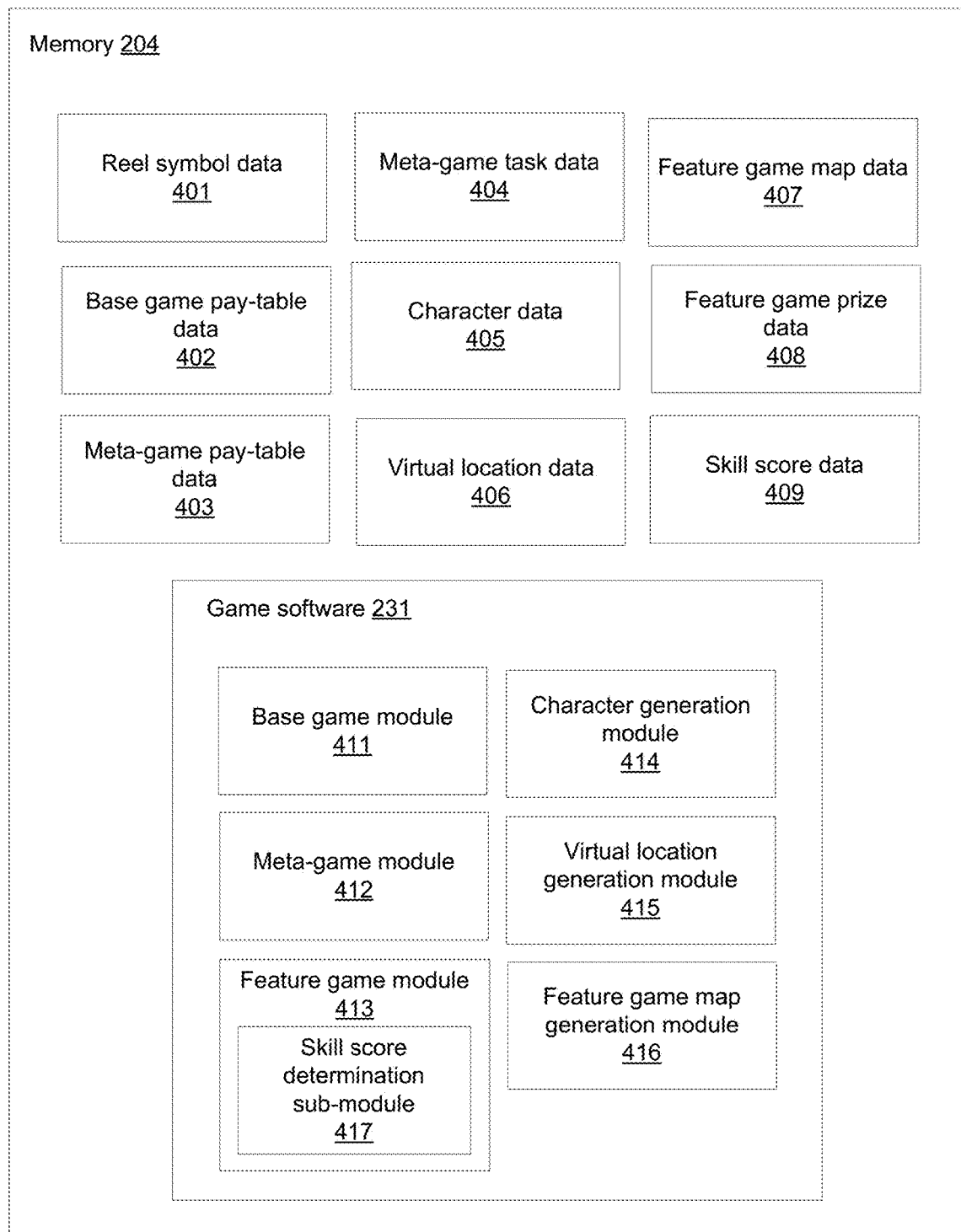
FIG. 4 is a schematic block diagram of the software components of a gaming system according to some embodiments.

A functional block diagram 400 illustrating software components of gaming machine 100 is shown in FIG. 4. Memory 204 stores game software module 231 which comprising a number of executable code modules. Memory 204 also stores various game data.

Game data stored by memory 204 includes symbol data 401, base game pay-table data 402, meta-game pay-table data 403, meta-game task data 404, character data 405, virtual location data 406, feature game map data 407, feature game prize data 408, and skill score data 409. In some embodiments, memory 204 may further store information about one or more game themes or game scenarios, which may be selectable by a player of the game, or automatically selected prior to game commencement. A theme may include a number of conceptually linked game aspects that contribute to the overall appearance and/or style of the game, as well as the specific appearance of various aspects of the game, as described below. A scenario may be linked to a game theme, or vice versa, and may include details of the game style, game objectives, and storyline of the game.

Symbol data 401 may include data relating to the symbols to be displayed on visual display unit 104 of gaming machine 100 during the base game. For example, the particular images used for each symbol may be stored, as well as an identification code relating to the symbol, and a value of the symbol in the base game. The visual appearance of the symbols may be dependent on the theme of the game.

Base game pay-table data 402 may include data relating to the pay-table used in the base game played on gaming machine 100. Base game pay-table data 402 may be used to calculate an amount of points, credits or other awards to be won by a player of gaming machine 100 when playing the base game. Base game pay-table data 402 may be used to determine the amount won based on which combination of symbols appear on visual display unit 104. Base game pay-table data 402 may be related to symbol data 401, as the amount won by a player as determined by the value of the symbols as stored in symbol data 401.

Meta-game pay-table data 403 may include data relating to the pay-table used in the meta-game played on gaming machine 100. Pay-table data 403 may be used to calculate an amount of points, credits or other awards to be won by a player of gaming machine 100 when playing the meta-game. Pay-table data 403 may be used to determine the amount won based on which combination of symbols appear on visual display unit 104. Meta-game pay-table data 403 may be related to symbol data 401. In some embodiments, meta-game pay-table data 403 may also be related to base game pay-table data 402, so that outcomes of the meta-game may be related to outcomes of the base game.

Meta-game task data 404 may include data relating to tasks to be completed by the player during a meta-game played on gaming machine 100. For example, meta-game task data 404 may include information about how many tasks a player needs to complete before they receive an award or obtain a particular level. Task data 404 may further include information about the symbol outcomes that may cause a task to be determined to have been completed. In some embodiments, meta-game task data 404 may be related to meta-game pay-table data 403, in order to allow the completion tasks to be completed based on outcomes as determined from the meta-game pay-table data 403. Meta-game task data 404 may also be related to location data 406 and character data 405, as the specific tasks to be completed may depend on the location and character selected by the player. In some embodiments, meta-game task data 404 may relate to game theme or game scenario data as well as or instead of location data 406. The tasks may also be dependent on the current theme of the game. The theme of the game may change over the course of playing the game. For example, once a player has completed one or more meta-game objectives and the feature game in a particular map location (having a particular associated theme), the player may elect to move to another map location that has a different associated theme. In some alternative embodiments, the theme and/or scenario of the game may be selectable by a player independent of or instead of the location.

Character data 405 may include data relating to a character selected by a player for playing a game on gaming machine 100. Character data 405 may include information about available characters including a character name, the appearance of the character, and initial skill levels of the character. In some embodiments, character data 405 may include data relating to the character selected by the player, and any modified attributes of the character, such as an increased level or increased skill set achieved through game play. The characters available in a particular game may be dependent on the theme of the game. In some embodiments, the character may be an avatar or player persona with graphical representation. The avatar may be a graphical representation of a human, animal, fictional being, vehicle, object, or other type of graphical representation in some embodiments.

Virtual location data 406 may include data relating to a virtual location selected by a player for playing a game on gaming machine 100. Virtual location data 406 may include information about available locations including a location name, one or more images of the location, and characteristics about the location. Virtual location data 406 may be related to character data 405, as the available characters may depend on the chosen location or vice versa. Virtual location data 406 may also be related to the meta-game task data 404, as the tasks presented during the meta-game may depend on the location selected. Virtual location data 406 may further be related to the symbol data 401, as the symbols presented during the base game may depend on the location selected. The current theme of a particular game may be dependent on the current selected virtual location of the game. Alternatively, locations available in a particular game may be dependent on the theme of the game. In some embodiments, the virtual location may change based on a scenario selected by the player. In some embodiments, the same virtual location may be used in all or some of a number of game scenarios.

Feature game map data 407 may include data relating to a map of a game play location for a feature game played on gaming machine 100. Feature game map data 407 may include information about the layout of a feature game location, including where game objects may be located within the virtual location. Feature game map data 407 may be related to virtual location data 406, as the feature game theme may be determined based on the virtual location selected or vice versa. Feature game map data 407 may further be related to character data 405, as the feature game location may be determined based on the character selected, and the level of the character. Feature game map data 407 may also be dependent on the current theme of the game.

Feature game prize data 408 may include data relating to an amount of points, credits or other awards to be won by a player of gaming machine 100 when playing the feature game. According to some embodiments, feature game prize data may include some or all of the values stored in prize pool meter 230. In some embodiments, feature game prize data 408 may store only non-monetary prize information. Feature game prize data 408 may include information about how many awards are to be included in the feature game, and where they should be located. Feature game prize data 408 may be related to feature game map data 407, in order to allow for the awards to be placed at various locations within the feature game location as defined by feature game map data 407.

Feature game prize data 408 may also include information regarding the awarding of skill points during the feature game to contribute toward a player's skill score. In particular, feature game prize data 408 may include data relating to predefined relationships between a player's actions in a feature game, and the amount of skill points such actions may add or subtract from the player's skill score. For example, feature game prize data 408 may define that skill points are to be added or subtracted from a player's skill score value stored in skill score data 409 based on a number of in-game items collected by the player in the feature game, a number of in-game opponents defeated by the player in the feature game, a time in which a player completes a task in the feature game, a difficulty of an action sequence or movement executed by the player in the feature game, an amount of damage inflicted upon an opponent by the player in the feature game, an amount of in-game consumables used by the player in the feature game, and an amount of damage inflicted upon the player in the feature game.

Skill score data 409 may store one or more skill score values relating to a player's performance in the feature game. According to some embodiments, an individual skill score value may be stored for each avatar that a player uses within the feature game. In some embodiments, only a single skill score may be stored for each player. According to some embodiments, a skill score may only exist during the length of a feature game, and may be reset every time a feature game ends. According to some alternative embodiments, a previously achieved skill score (or a residual part or percentage of that score) may persist over the duration of more than one feature game. Processor 202 may be configured to add or subtract points from the skill score values stored in skill score data 409 based on the relationships defined by feature game prize data 408, as described above.

In this document, a skill score relates to a score, rating, grade, mark, level, measure, degree or indicator, which is determined based on an assessment of the performance of a player in a feature game. The skill score may be a skill indicator. According to some embodiments, the skill score or skill indicator may be stored as a number, such as a number of points earned or a numerical level reached by a player corresponding to a measure of the player's performance in a feature game. In some embodiments, the skill score or skill indicator may be stored as a letter, word, or description corresponding to a measure of the player's performance in a feature game.

In some embodiments, the game machine 100/304 may have an overall theme for all of the game play, plus a number of sub-themes for different parts or stages of base game play and/or meta-game play and/or feature game play.

In some embodiments, code modules within game software module 231 may include base game module 411, meta-game module 412, feature game module 413, character generation module 414, virtual location generation module 415, feature game map generation module 416, and other code modules.

Base game module 411 may be executable by processor 202 to cause a base game, which may be a reel-type game in some embodiments, to be displayed on visual display unit 104. The base game may be any chance-based game, in which a symbol sub-set, such as a two-dimensional array of symbols, is randomly selected from a larger symbol set for display on visual display unit 104, with or without the appearance of spinning reels. The symbol set from which the displayed symbol subset is randomly selected for the base game is sized to permit a reasonable degree of variation among the selected symbols across a significant number of instances of symbol sub-set generation. The symbol sub-set may include multiple instances of the same symbol.

Base game module 411 may be executed when a player initiates game play using user input 218. Base game module 411 may allow a player to make a bet or wager using credit input mechanism 221, input mechanisms 106, and user input 218, and may determine a random game outcome using random number generator 210. Executing base game module 411 may cause processor 202 to determine whether the player won any credits or other awards using base-game pay-table data 402. Processor 202 may then cause gaming machine 100 to credit the player with any winnings using payout mechanism 225.

Meta-game module 412 may be executable by processor 202 to cause a meta-game to be shown on visual display unit 104. In some embodiments, the meta-game may include a reel-based game, and may use the same reels as those used for the base game. The meta-game may be any chance-based game, in which a symbol sub-set, such as a two-dimensional array of symbols, is randomly selected from a larger symbol set for display on visual display unit 104 with or without the appearance of spinning reels. The symbol set from which the displayed symbol subset is randomly selected for the meta-game is sized to permit a reasonable degree of variation among the selected symbols across a significant number of instances of symbol sub-set generation. The symbol sub-set may include multiple instances of the same symbol.

In some embodiments, meta-game module 412 may be executed when a player initiates game play using user input 218. Meta-game module 412 may include a series of tasks which must be completed. In some embodiments, the completion of the tasks is dependent on the appearance of certain symbols or combinations of symbols in a randomly generated symbol sub-set in the base game. For example, a particular symbol or combination of symbols appearing as part of the base game may contribute to the completion of a task. The base game and meta-game may therefore rely on the same randomly generated symbol sub-set, although a winning symbol combination in the base game may not also be a winning symbol combination in the meta-game. In other words, the same symbol subset upon which the outcomes of the base game and meta-game are based can lead to different results in each of the base game and meta-game. For example, a winning result in the base game may not correspond with a winning result in the meta-game and vice versa. Additionally, while a winning result in the base game provides monetary reward, a winning result in the meta-game provides non-monetary reward, such as advancement of the player's character toward a character achievement milestone, such as a level increase or a skill or attribute increase. The non-monetary rewards earned in the meta-game can lead to a greater prospect of earning monetary rewards in the skill-based feature game, as described below.

The rules basis and paradigm for determining a winning outcome in the meta-game may be different from the rules and paradigm to determine a winning outcome in the base game. For example, a winning outcome in the meta-game may be due to the appearance of only one symbol among the randomly generated symbol subset, without necessarily relying on a combination of symbols being present in the symbol subset. Further a winning outcome in the meta-game may be due to the appearance of a symbol combination among the randomly generated symbol subset that does not align with a particular play line (i.e. predetermined linear sequence of symbols), whereas the base game may rely on a combination of symbols being present in the symbol subset along a predetermined play line in order to be determined to be a winning outcome. Executing meta-game module 412 may cause processor 202 to determine whether the player completed a meta-game task using meta-game pay-table data 403.

Feature game module 413 may be executable by processor 202 to cause a feature game to be shown on visual display unit 104. In some embodiments, the feature game may be a dungeon crawl or treasure hunt type game, where a player must navigate through a virtual location and interact with virtual objects to win credits or other awards. In some embodiments, feature game module 413 may cause a virtual location to be shown on visual display unit 104 based on feature game map data 407. Prizes may be distributed throughout the virtual location based on feature game prize data 408. In some embodiments, the prizes may be hidden in virtual chests, boxes or other objects that the player must open or otherwise interact with in order to retrieve the prizes. In some embodiments, only some of the virtual chests, boxes or other objects will contain prizes. In some embodiments, a player may need to solve puzzles, battle villains, or complete other tasks in order to obtain prizes. In some embodiments, the prizes may include either or both monetary and non-monetary prizes.

According to some embodiments, feature game module 413 may include skill score determination sub-module 417. Processor 202 executing skill score determination sub-module 417 may be configured to read data from, operate on, and store data to skill score data 409 based on rules defined by feature game prize data 408. For example, feature game prize data 408 may define a rule that a player's avatar is to be awarded five skill points if it discovers and opens a particular treasure chest in a dungeon crawl style feature game. Processor 202 may execute feature game module 413 to cause the feature game to be shown on visual display unit 104, and may further execute feature game map generation module 416 to determine the layout of the game and where the treasure chest is to be virtually positioned. If the avatar finds the treasure chest, processor 202 reads feature game prize data 408 to determine the applicable event rule and thereby determine what prize is to be awarded to the avatar for the event of finding the chest. Based on the stored event rule specifying what happens when the event of the treasure chest being found occurs, processor 202 determines that the prize is an award of skill points, and executes skill score determination sub-module 417 to read skill score data 409, add five points to the value read, and store the new value back to skill score data 409. Processor 202 may execute skill score determination sub-module 417 based on the occurrence of a skill score determination triggering event. This may be only at the end of a feature game, if the triggering event is the end or completion of the feature game. Alternatively, processor 202 may execute skill score determination sub-module 417 throughout the feature game, so that the skill score is calculated in real time. According to some embodiments, processor 202 may execute skill score determination sub-module 417 every time a triggering event occurs. A triggering event may be any event that has been predetermined according to stored event rules to alter the skill score. This may include an occurrence, action or achievement (either success or failure) by the character or avatar, such as defeating an opponent, finding a hidden item, using a consumable, or receiving damage, for example.

Character generation module 414 may be executable by processor 202 to cause one or more characters to be generated and displayed on gaming machine 100 for selection and/or modification by a player. In some embodiments, character generation may include a player being able to generate a unique character based on a number of configurable character attributes, such as character type (e.g. warrior, wizard, troll, elf etc.) body shape, skin tone, hair colour, sex and clothing. In some alternative embodiments, pregenerated characters may be retrieved from character data 405 and displayed for a player to select. Selected character data may be stored in character data 405.

Virtual location generation module 415 may be executed by processor 202 to cause one or more virtual locations to be generated and displayed on gaming machine 100 for selection by a player. In some embodiments, the one or more virtual locations may be displayed on a map. The virtual locations may be generated based on virtual location data 406.

Feature game map generation module 416 may be executed by processor 202 to cause virtual location images to be generated and displayed on gaming machine 100 for playing the feature game. The feature game map may be generated based on feature game map data 407.

Figure 5:
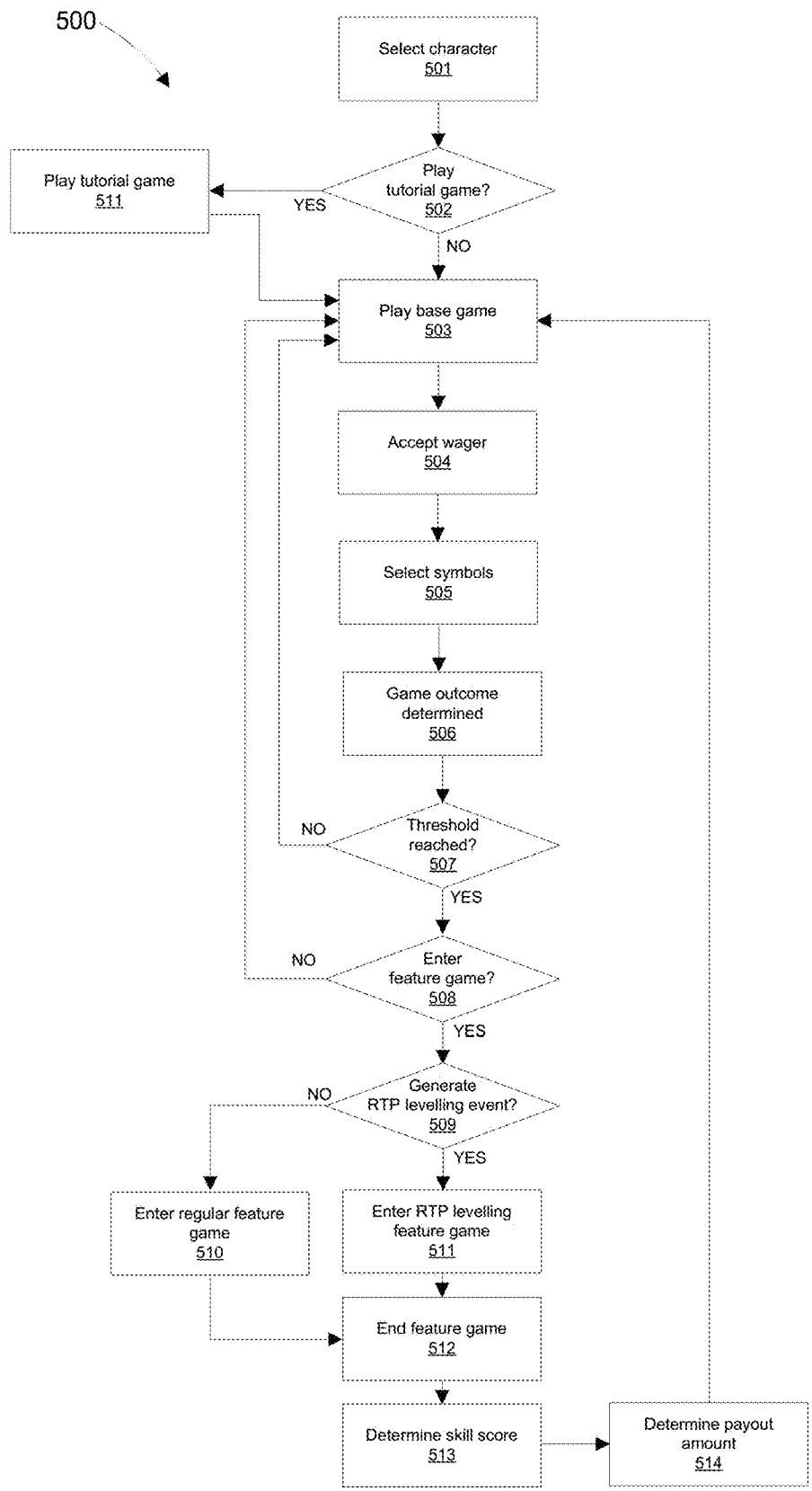
FIG. 5 is a flow diagram illustrating a method of controlling game play on a gaming machine according to some embodiments.

Referring now to FIG. 5, there is shown a flow diagram illustrating a method 500 of gaming by implementing a game at a gaming system, such as gaming machine 100 illustrated in FIG. 2 and gaming machines 304 illustrated in FIG. 3.

The method 500 of gaming may comprise an initial step 501 of a player providing credit at credit input mechanism 221 of the gaming machine 100, and selecting a character for game play. In some embodiments, this may also include entering a name to be associated with the character. Processor 202 may execute character generation module 414, which may read from character data 405. The character may be selected by scrolling through a series of available characters on the touchscreen display of gaming machine 100. In some embodiments, the character may be created by the player by choosing from a number of different options for character components. For example, the player may be able to generate a character by selecting from various body shapes, facial features, hairstyles, and clothing for the character to have. The character created by the player may be stored in character data 405.

In some embodiments, the player may be able to select a previously created character that has been stored by the system in character data 405. In some embodiments, the player may be able to scan a ticket that stores data related to a previously created character. Gaming machine 100 may be configured to access data from a stored player account or player profile based on the data read from the ticket. Processor 202 may retrieve the player account information based on a database lookup using the data read from the ticket.

In some embodiments, each selectable character may have a number of predetermined base attribute ratings stored in character data 405. For example, characters may have attributes such as strength, agility and speed. In some embodiments, different or additional attributes may exist. For example, in some embodiments, characters may have attributes such as wisdom, dexterity, and/or endurance. These attributes may be measured on a scale of 1 to 10, for example. Each character may have a base rating for each attribute. A particular character may have a strength rating of 6, an agility rating of 3 and a speed rating of 4, for example. In some alternative embodiments, the attributes may be measured based on a different numerical scale (1 to 5, 1 to 20, or 1 to 100, for example), or on a non-numerical scale, which might be a graphical representation of the attribute on a bar, a number of stars, or some other scale. The character may also have a predetermined base level. In some embodiments, all characters start at base level 1.

In some embodiments, the selected character may be able to be changed during gameplay using user input 218. If a character is changed, they may retain some or all of the levels and skills of the previously selected character.

In some embodiments, the player may also be able to select a virtual game play location from a map. Processor 202 may execute virtual location generation module 415, which may read from virtual location data 405 to display images of a map showing a number of selectable locations on visual display unit 104. For example, the selectable locations may include a forest, desert, castle, and/or swamp in some embodiments. Virtual game play locations may be tailored to a general theme of the game. In some embodiments, the selection of the character may determine the virtual game play starting location. For example, selecting a knight character may result in game play beginning in a virtual castle, while selecting an elf may result in game play in a virtual forest, and selecting a troll may result in game play beginning in a virtual swamp.

After a character selection has been made, in some embodiments a tutorial game may be presented to the player at step 502, based on predetermined selection criteria. In some embodiments, the tutorial game may be a simulation of the feature game, or an aspect of the feature game. In some embodiments, the tutorial game may not allow the player to win any monetary rewards. In some embodiments, entry into the tutorial game may be determined based upon whether or not the player is a new player or an experienced player, the level of the player's character, how long it has been since the player played the game last, or other criteria. In some embodiments, entry into the tutorial game may be at the election of the player. If the criteria for entering the tutorial game is met, the method moves to step 510, and a tutorial game is presented to the player.

The tutorial game may help a player become familiar with the controls used and gameplay style of the feature game, as described below. In some embodiments, the tutorial game may teach a player new tricks, skills or combinations that they can apply during the feature game. Once the tutorial game is over, the method moves to step 503. If the criteria is not met, a tutorial game is not played, and the method moves to step 503.

According to some embodiments, the tutorial game may be presented to the player at various stages of game play, and not only at the start of gameplay. For example, in some embodiments the tutorial game may be presented to the player when their character or avatar achieves a new level, learns a new skill or receives a new weapon.

At step 503, a base game is implemented on gaming machine 100 by processor 202 executing base game module 411. In some embodiments, the base game may be a reel game, which may be generated using symbol data 401. In some embodiments, the base game may be a different chance based game in which symbols are randomly selected from a symbol set for display on visual display unit 104, without the appearance of spinning reels.

At step 504, a player causes an instance of base game module 411 to be initiated by processor 202, through interaction with user input 118. The amount bet by the player may be split up into two prize pools, being a base game prize pool, and a feature game prize pool. Some of the wager may also be kept by the house, being the business or establishment that owns and/or controls gaming machines 100/304. The amount kept by the house may be varied based on the regulatory rules in the jurisdiction the game is being played in.

As the base game is initiated, processor 202 may also initiate meta-game module 412 based on meta-game task data 404. The meta-game may comprise a series of tasks to be completed by the player. Progress and completion of the tasks may be determined based on outcomes of the base game as determined with reference to meta-game pay-table data 403.

At step 505, base game module 411 is executed by processor 202 to cause a plurality of symbols derived from symbol data 401 to be selected by processor 202 for display at a plurality of display positions on a visual display unit 104. In some embodiments, where the base game is a reel game, base game module 411 may be executed by processor 202 to cause the reels to appear to virtually spin on visual display unit 104. The selection of the symbols may be performed randomly, for example by the random number generator 414.

In a further step 506, a game outcome is determined based on the randomly displayed symbols on the display. The game outcome may consist of a base game outcome, determined by processor 202 based on base game pay-table data 402, and a meta-game outcome determined by processor 202 based on meta-game pay-table data 403. The base game outcome may result in the awarding of a monetary prize to the player, based on the particular symbols displayed. If a base game outcome results in the winning of a monetary reward, this may be credited to the player immediately in some embodiments through payout mechanism 225. In some other embodiments, the amount won may be stored and accumulated during the game session, and the total amount may be awarded at the end of the game session. The amount won may be taken out of the base game prize pool. The amount won may be awarded as cash, or as credits that can be redeemed for cash.

The meta-game outcome may allow the player to progress towards and/or complete one or more tasks or quests set in the meta-game, as determined by meta-game module 412 based on meta-game task data 404. The progress made toward the completion of each task may be displayed to the player in the form of a fraction, percentage, progress bar, or other means of showing the advancement through the task. If the meta-game outcome results in the completion of all of the set tasks, the player level as stored in character data 405 may be increased. In some embodiments, some or all of the player attributes stored in character data 405 may also be increased.

In some embodiments, the meta-game outcome may alternatively or in addition allow a player to achieve other rewards. This may be on the completion of all tasks within a quest, each time a task is completed, or simply based on the combination of symbols displayed during the game. In some embodiments, the meta-game outcome may allow a player to win a reward, such as an aesthetic reward or skill-based reward, that they can apply to their character. In some embodiments, the player may be able to win one or more units of an in-game virtual currency, which the player may later be able to use to purchase an aesthetic or skill based reward. For example, a game may allow a player to win in-game credits, coins, jewels, tokens, or another form of virtual currency. Different aesthetic and skill based rewards may be able to be virtually purchased, and may each cost a different amount. For example, a cloak may cost 3 coins, a healing potion might cost 5 coins, and a pair of boots that increases player speed may cost 10 coins, in some embodiments.

At step 507, processor 202 may determine whether a threshold has been reached that allows for entry into a feature game. In some embodiments, the entry to the feature game may be by a predetermined symbol or symbol combination appearing on the reels. In some alternative embodiments, entry to the feature game may be based on reaching a time-based threshold (that the player has been playing the game for at least 5 minutes, 10 minutes, 15 minutes, 20 minutes, 25 minutes or 30 minutes, for example), a spend based threshold (that the player has spent a particular amount of money) or a games played threshold (that the player has played a particular number of base games). Multiple different threshold conditions may be applied in combination. In some embodiments, entry to a feature game may be semi-randomised after the threshold condition has been met, for example where the entry is selected at random from a range in addition to or on top of the threshold. For example, for a given base spend threshold, such as 100 credits, entry into the feature game may occur at a randomly selected time between 5 minutes and 10 minutes after reaching the base spend threshold.

If the threshold has not been reached, game play returns to step 503, with processor 202 causing base game module 411 to re-initiate and the player having a further opportunity to place a wager and play the base game.

If the threshold has been reached, at optional step 508 the player is given the opportunity to enter the feature game. If the player chooses not to enter the feature game, which may be to allow themselves time to meet more meta-game objectives, for example, the play returns to step 503, with processor 202 causing base game module 411 to re-initiate and the player having a further opportunity to place a wager and play the base game. In some embodiments, the player is not given the option to enter the feature game, but is forced to enter the feature game once the threshold has been reached at step 507. In some embodiments, the player may initially be given the option to enter the game after a threshold is reached, but may subsequently be forced to enter the feature game after a predetermined limit has been reached. For example, the player may be forced to enter the feature game after a predetermined amount of time, after a predetermined number of base games have been played, once the player's character reaches a predetermined level, or after the player has spent a predetermined amount of money or credits, for example.

If the player chooses to enter the feature game, at step 509 processor 202 determines whether or not to generate a return-to-player (RTP) levelling event. According to some embodiments, this step may be performed at any time before or during play of the feature game. An RTP levelling event is a randomly generated event that causes a relatively large payout to the player to occur, so that the RTP percentage of gaming machine 100 meets regulatory requirements. According to some embodiments, the generation of a RTP levelling event may cause a predetermined percentage of one or more monetary prize pools as defined by prize pool meter 230 to be paid out to the player. For example, an RTP levelling event may cause a value of between 60% and 100%, which may be 60%, 70%, 80%, 90% or 100%, of a prize pool to be paid out to the player. According to some embodiments, the RTP levelling event may cause skill score determination sub-module 417 to multiply the skill score achieved by the player by a pre-determined amount, which may be 100, 500, 1000 or 2000, for example. In some embodiments, the RTP levelling event may otherwise affect the execution of feature game module 413, such as causing a characteristic of the avatar to be changed in favour of the player, for example, by making the avatar invulnerable to attacks, giving the avatar increased speed or increased strength, or otherwise causing the skill score achieved by the player to be substantially increased when compared to a regular session of the feature game.

Processor 202 may communicate with random number generator 210 to determine whether a RTP levelling event should be generated. Random number generator 210 may randomly determine whether or not to generate an RTP event based on a predetermined probability, which may be 1 in 100,0000, 1 in 150,000, 1 in 200,000, 1 in 250,000 1 in 300,000, or another probability, for example.

If random number generator 210 determined that an RTP levelling event should not be generated, a regular feature game is initiated at step 510 by processor 202 executing feature game module 413. The feature game may be a skill-based adventure game in some embodiments. In some alternative embodiments, the skill-based feature game may include an additional chance-based game.

Skill-based in this context means that a progression in the game depends on the skill of the player in relation to the game rules. In other words, the game rules stored in game software 231 define a set of conditions and the player aims to meet these conditions by use of user input 218. According to some embodiments, the conditions may be dynamic, in which case the player may be required to 'chase' these dynamic conditions. For example, processor 202 may change the location or behaviour of characters displayed on video display unit 104. One dynamic condition may be that the player should move their player controlled avatar sufficiently close to the character, and then cause the avatar to initiate an attack in order to kill the character. The player may use user inputs 218 such as a joystick and one or more attack buttons to control the avatar. The skill of the player in this example is expressed in the ability to operate the joystick and attack button accurately and quickly in order to meet the condition. Processor 202 receives the input signals generated by the joystick and button, or other user input 218, and calculates the resulting activities of the avatar in relation to the conditions, such as in relation to the computed location of other characters including opponents. Other player skills may include reaction time, combinatorial skill, knowledge, vision and many others. One aspect of a skill-based game is that the player has the impression that his or her skill can be improved and the chances of winning increased by further training on the gaming machine.

Player attributes stored in character data 405 may contribute to the likelihood of success in the feature game, whether it be skill or chance based. For example, a character with higher strength rating may be more likely to succeed in certain actions in the feature game than a character with a lower strength rating (for example, breaking open a treasure chest).

The feature game may allow the player to win both monetary and non-monetary prizes. The monetary prizes may be paid out of the feature game pool. Non-monetary prizes may include improvements to the visual appearance of the character, such as new hairstyles, clothing and accessories. In some embodiments, the non-monetary prizes may also include direct or indirect improvements to the character's attribute ratings. For example, a non-monetary prize may be that the player's character's strength is increased by 10%. An example of an in-direct improvement may be that the character receives boots that improve their speed, or gloves that improve their dexterity. The prizes available in any feature game may be determined by processor 202 based on feature game prize data 408.

Non-monetary prizes may also include skill points that may contribute to a player's skill score. According to some embodiments, skill points may be won based on an avatar action or feat that is considered positive, skilful, or desirable based on the game rules. In some embodiments, skill points may be won based on demonstrating a high level of skill in the play of the skill based feature game, such as by collecting in-game items, defeating in-game opponents, completing tasks quickly or within a predefined time limit, executing difficult action sequences, and inflicting damage upon opponents, for example. Skill points may be lost based on an avatar action or feat that is considered negative, unskilful, or undesirable based on the game rules. In some embodiments, skill points may be lost by demonstrating a low level of skill in the play of the skill based feature game, such as by competing tasks slowly, or outside a predefined time limit, using in-game consumables, receiving damage, and being defeated by opponents, for example. An avatar action may include an inaction or omission by the avatar, as well as an action done to the avatar by another avatar, object or force within the game.

According to some embodiments, the feature game may include a "treasure hunt" type game, in which a player must navigate through a virtual environment and interact with virtual objects to gain rewards. For example, in some embodiments the player may navigate through a dungeon-type environment, and open chests to gain rewards. Each chest may be predetermined to contain a monetary or non-monetary reward, or to be empty, for example. The player may navigate through the virtual environment using user input 218.

In some embodiments, the feature game may include an arena style battle game, a racing game, a first person shooter, or another type of game that allows a player to control one or more virtual objects or characters through one or more virtual scenarios.

The theme of the virtual environment navigable during the feature game may depend on the virtual game play location selected at step 503, the game scenario, and/or character level. For example, if the player selected a knight character, the game play may take place in a castle. A level 1 knight may need to navigate through the dungeons of the castle, for example, while a level 2 knight may navigate through the servant's quarters. A higher level knight, such as a level 8 knight, may need to navigate through the king's chamber. As the character progresses through the levels, the game play location may be altered appropriately. In some embodiments, the player may be able to select a particular virtual location for the feature game. The virtual environment may be pre-generated and stored in feature game map data 407.

If random number generator 210 determined that an RTP levelling event should be generated, an RTP levelling feature game is initiated at step 511 by processor 202 executing feature game module 413. The RTP levelling feature game may be a skill-based adventure game in some embodiments, as described above with reference to step 510. In some alternative embodiments, the skill-based feature game may include an additional chance-based game.

The RTP levelling feature game may be substantially the same as a regular feature game as described above. However, the RTP levelling game is modified to ensure that a relatively large percentage of one or more monetary prize pools as defined by prize pool meter 230 is paid out to the player. As described above, this may be done by causing payout component 224 to pay out a predetermined percentage of one or more monetary prize pools as defined by prize pool meter 230, regardless of the skill score achieved by the player. This may be a value of between 60% and 100%, which may be 60%, 70%, 80%, 90% or 100%, for example. According to some alternative embodiments, the RTP levelling event may cause skill score determination sub-module 417 to multiply the skill score achieved by the player by a pre-determined amount, which may be 100, 500, 1000 or 2000, for example. In some embodiments, the RTP levelling event may otherwise affect the execution of feature game module 413 to super power the avatar, such as by causing the player to be invulnerable to attacks, giving the player increased speed or increased strength, or otherwise causing the skill score achieved by the player to be substantially increased when compared to a regular session of the feature game.

The regular or RTP levelling feature game may run until a predetermined threshold is reached at step 512. This may be a time-based threshold, or an achievement based threshold, for example.

In some embodiments, the player may be able to end the game session at any point during gameplay. According to some embodiments, when the player ends the game session, the player's skill score is determined at step 512 by skill score determination sub-module 417, based on a record of the player's game play stored in memory 204. According to some embodiments, the skill score may alternatively be calculated in real-time during game play based on the occurrence of a triggering event, as described above with reference to FIG. 1.

Once the skill score has been determined, processor 202 determines whether the player should be awarded a monetary payout, and what the monetary payout should be. The monetary payout is calculated at step 514 by processor 202 and payout component 224 based on the skill score and the prize pool data stored in prize pool meter 230. According to some embodiments, the payout amount may be the amount stored in one or more multi-stage prize pools, as described below with reference to FIG. 14. According to some embodiments, the payout amount may be a percentage of a percentage based prize pool, as described below with reference to FIG. 15. According to some embodiments, processor 202 may determine whether the multi-stage prize pools or the percentage based prize pool should be used based on whether one or more predetermined symbols were displayed during play of the base game or another chance based game. In some embodiments, processor 202 may randomly determine which prize pools should be used. According to some embodiments, processor 202 may present the user with a display screen allowing a user to select which prize pool to play for. According to some embodiments, the monetary payout value may alternatively be calculated in real-time during game play based on the occurrence of a triggering event.

In some embodiments, processor 202 may be further configured to determine whether the player should be awarded a non-monetary reward based on their skill score or performance throughout the feature game. For example, in some embodiments that skill score may be used to determine whether a level of a player avatar should be increased, whether a game influencing item should be awarded to the player, or whether an amount of in-game currency should be awarded to the player.

Where an RTP levelling event has occurred, the payout amount may be determined without reference to the skill score achieved. According to some embodiments, where a RTP levelling event has occurred, the payout amount may be 100% of each of the multi-stage prize pool segments described below with reference to FIG. 14, or 100% of the percentage based prize pool described below with reference to FIG. 15.

Any accumulated winnings may be paid out to the player, in the form of cash or credits using payout mechanism 225. In some embodiments, gaming machine 100 may also issue a ticket corresponding to the player's character in the game. The ticket may allow a player to load their character into the game at their next gaming session, as described above with reference to step 501. In some embodiments, the player may be able to use the ticket to upload their character into an online gaming environment. In some embodiments, only character aesthetics, and not attributes earned through playing the base game, may be able to be transferred. In some alternative embodiments, character ability ratings, in addition to or instead of character aesthetics, may be able to be transferred via the ticket.

Once any winnings have been paid, the game will be directed back to the base game at step 503 by processor 202 re-initiating base game module 411. In some embodiments, a player may choose to defer receiving any payout until after one or more further gaming sessions.

In some embodiments, instead of a ticket, character data may be stored in another form, such as using a QR code, smart card, magnetic stripe card, near field transfer, or another electronic or non-electronic means of data storage, that the player can use to store their character data to load their character into the game at their next gaming session.

Figure 16:
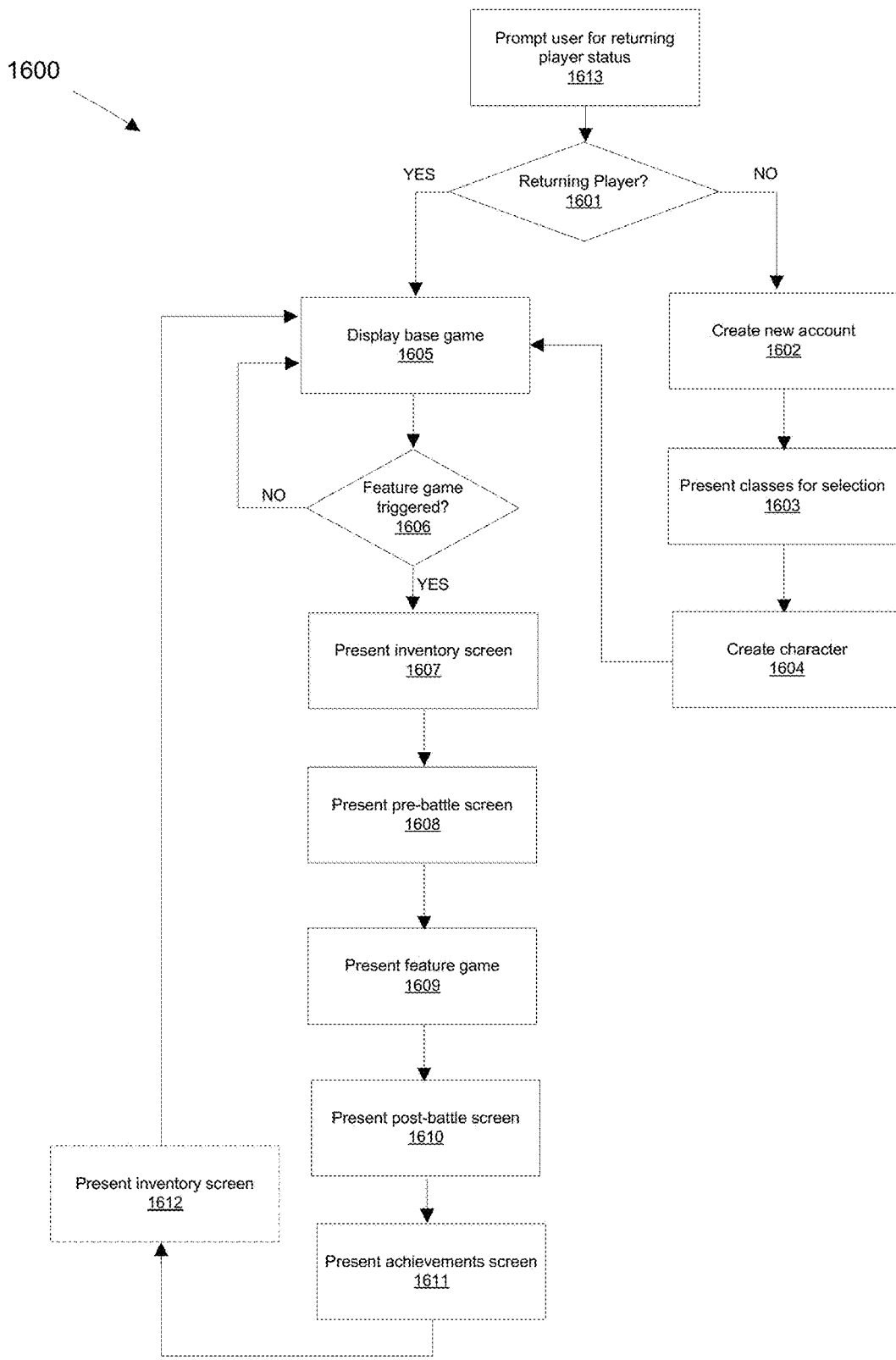
FIG. 16 is a flow diagram illustrating a method of controlling game play on a gaming machine according to some embodiments.

FIG. 16 illustrates an alternative method 1600 of gaming by implementing a game at a gaming system, such as gaming machine 100 illustrated in FIG. 2 and gaming machines 304 illustrated in FIG. 3.

The method 1600 of gaming may comprise an initial step 1618 of processor 202 executing code to generate a graphical display on video display 104 of gaming machine 100/304 to prompt a player to indicate whether the player is a returning player or a new player. The prompt may be in the form of a text-based question displayed on video display 104 of gaming machine 100/304, and may ask the player to respond by interacting with one or more user input components. For example, if the player is a returning player, the player may be able to scan a ticket or provide account information, such as a name and password, that stores data related to the player's account. Processor 202 may be configured to authenticate a user account based on the provided account information. Processor 202 may be configured to use the stored data to access a player database, which may be stored on gaming machine 100/304 or on an external device, such as a server 308/310, to retrieve any required game information, such as the player's avatar and level. If the player is a new player, the player may be able to indicate this by clicking on a virtual button displayed on the prompt screen, for example.

At step 1601, processor 202 determines the player's returning player status based on the user input received. If processor 202 determines that the player is a returning player, processor 202 is configured to perform step 1605. If the player is determined to be a new player, processor 202 is configured to perform step 1602, which may comprise processor 202 generating a prompt to display to the player via video display 104 of gaming machine 100/300, prompting a player to create a new account, which may require the player to use user input 218 to enter details such as an account name and password, for example. According to some embodiments, processor 202 may be configured to cause video display 104 to present the player the option of not creating a new account, and instead playing as a "guest", which would not require the player to enter any account information. According to some embodiments, gaming machine 100/304 may be configured to operate without creating user accounts. In some embodiments, game play information may be written by processor 202 to a physical or virtual ticket, which the player may be able to use to store their progress in the game and to retrieve at least some of the player's past game progress, avatar development and/or equipment or other game items at the player's next gaming session.

Processor 202 is configured to generate a prompt, and cause video display 104 of gaming machine 100/300 to display the prompt asking the player to select a player class at step 1603. The class may be a character type, such as a warrior, hunter, rogue or mage, for example. At step 1604, processor 202 may be configured to generate and cause video display 104 of gaming machine 100/304 to display a prompt to ask the player to create a character. In some embodiments, processor 202 may also be configured to generate and cause video display 104 of gaming machine 100/304 to display a prompt to enter a name to be associated with the character. Processor 202 may execute character generation module 414, which may read from character data 405 to retrieve character information and display the character on video display 104 of gaming machine 100/304. The character may be selected by scrolling through a series of available characters on the touchscreen display of gaming machine 100. In some embodiments, the character may be created by the player by choosing from a number of different options for character components. For example, the player may be able to generate a character by selecting from various body shapes, facial features, hairstyles, and clothing for the character to have. The character created by the player may be stored in the player's account information, and/or stored in a temporary memory location in memory 204, and may be printed or otherwise written to a physical or virtual ticket at the end of the session to allow the player to retrieve the player's saved character for a subsequent gaming session.

According to some embodiments, steps 1603 and 1604 may be performed in a single step. For example, according to some embodiments, processor 202 may be configured to automatically select a character based on the player selection of a class. In some alternative embodiments, processor 202 may be configured to generate graphical prompts for display on video display 104 to the player to select a character first, and may automatically select a class based on a class associated with the chosen character.

Processor 202 is configured to implement a base game by executing base game module 411 at step 1605. In some embodiments, the base game may be a reel game, which may be conducted by processor 202 executing base game module 411. Processor 202 may be configured to retrieve symbol data 401 for conducting the base game. In some embodiments, the base game may be a different chance-based game in which symbols are randomly selected from a symbol set for display on visual display unit 104, without the appearance of spinning reels. The player may cause an instance of base game module 411 to be initiated by processor 202, through interaction with user input 118. Base game module 411 is executed by processor 202 to cause a plurality of symbols derived from symbol data 401 to be selected by processor 202 for display at a plurality of display positions on a visual display unit 104. In some embodiments, where the base game is a reel game, base game module 411 may be executed by processor 202 to cause the reels to appear to virtually spin on visual display unit 104. The selection of the symbols may be performed randomly, for example by the random number generator 414.

As described above with reference to FIG. 5, a game outcome is determined based on the randomly displayed symbols on the display. The game outcome may consist of a base game outcome, determined by processor 202 based on base game pay-table data 402, and a meta-game outcome determined by processor 202 based on meta-game pay-table data 403. The base game outcome may result in the awarding of a monetary prize to the player, based on the particular symbols displayed. If a base game outcome results in the winning of a monetary reward, this may be credited to the player immediately in some embodiments through payout mechanism 225. In some other embodiments, the amount won may be stored and accumulated during the game session, and the total amount may be awarded at the end of the game session. The amount won may be taken out of the base game prize pool. The amount won may be awarded as cash, or as credits that can be redeemed for cash.

The meta-game outcome may allow the player to progress towards and/or complete one or more tasks or quests set in the meta-game, as determined by meta-game module 412 based on meta-game task data 404. The progress made toward the completion of each task may be displayed to the player in the form of a fraction, percentage, progress bar, or other means of showing the advancement through the task. If the meta-game outcome results in the completion of all of the set tasks, the player level as stored in character data 405 may be incremented. In some embodiments, some or all of the player attributes stored in character data 405 may also be incremented or increased.

In some embodiments, the meta-game outcome may alternatively or in addition allow for additional rewards to be awarded to the player. Additional rewards may be awarded on the completion of all tasks within a quest, each time a task is completed, or simply based on the combination of symbols displayed during the game. In some embodiments, the meta-game outcome may allow for a reward that the player can apply to their character, such as an aesthetic reward or skill-based reward, to be awarded. In some embodiments, processor 202 may be configured to award the player one or more units of an in-game virtual currency, which the player may later be able to use to purchase an aesthetic or skill based reward. For example, processor 202 may be configured to award in-game credits, coins, jewels, tokens, or another form of virtual currency. According to some embodiments, more than one different form of virtual currency may be awarded during the meta-game, and the different forms of currency may be used to purchase different types of items. Different aesthetic and skill-based rewards may be able to be virtually purchased with the virtual currency, and may each cost a different amount. For example, a cloak may cost 3 coins, a healing potion might cost 5 coins, and a pair of boots that increases character or avatar speed may cost 10 coins, in some embodiments.

At step 1606, processor 202 determines whether a trigger event has occurred that allows for entry into a feature game. In some embodiments, the trigger event may be a software event. According to some embodiments, the occurrence of the trigger event may be indicated to the player visually through video display 104 by the display of a predetermined symbol or symbol combination on the game display, for example on the reels. In some embodiments, as described above with respect to FIG. 5, the trigger event may be configured to only occur after the player reaches a time-based threshold, a spend-based threshold, or a games-played threshold. According to some embodiments, the trigger event may be configured to occur at a random or pseudo-random time. According to some embodiments, the trigger event may be configured to occur at a random or pseudo-random time within a set time period after the player reaches a time-based threshold, a spend-based threshold, or a games-played threshold. For example, the trigger event may be configured to occur at a random time within a set time period after the player reaches a time-based threshold, which may be a time limit of 5, 10 or 15 minutes, for example. According to some embodiments, the trigger event may be configured to have a predetermined probability of occurring within a predetermined time period. For example, the trigger event may be configured to have an 80% probability of occurring within 5 minutes after a games-played threshold is reached, for example.

Until the trigger event occurs, game play continues at step 1605, with processor 202 causing base game module 411 to continue play and the player having a further opportunity to place a wager and play the base game.

If the trigger event occurs, at step 1607, processor 202 may optionally cause video display 104 to present an inventory screen to allow the player the opportunity to edit the player's inventory before entering the feature game. For example, the inventory screen may display virtual items owned by the player, such as weapons and potions. Processor 202 may be configured to display the virtual inventory items, and provide the player with an opportunity to purchase new items or discard existing items from the inventory. Once the player is satisfied with the contents of the inventory, processor 202 may receive input from the player to exit the inventory page, and in response, processor 202 may cause video display 104 of gaming machine 100/300 to optionally display a pre-battle screen at step 1608, which may allow a user to make any final character adjustments before entering the feature game, such as upgrading weapons or shields, using potions or other special items.

According to some embodiments, the pre-battle screen may be displayed before the inventory screen. According to some embodiments, only one of the pre-battle screen and the inventory screen may be displayed. According to some embodiments, one or more of the pre-battle screen and the inventory screen may be displayed for a limited predetermined time period. Once the predetermined time period expires, processor 202 may cause the method to automatically progress to the next step.

According to some embodiments, some selections made on the pre-battle screen may be modified during the feature game. For example, a player may be able to select a different weapon to use mid-way through the feature game, in some embodiments.

When a player indicates using user input 218 that the player is satisfied with the pre-battle selections, or the pre-determined time period has expired, the feature game is initiated at step 1609 by processor 202 executing feature game module 413. The feature game may be a skill-based adventure game in some embodiments. The feature game may be a battle, treasure hunt, first person shooter, quest, or other type of skill-based game, as described above with reference to FIG. 5.

Gaming machine 100/3034 may cause the feature game to run until a predetermined threshold, triggering event or end event is reached. Once the feature game ends, at step 1610 video display 104 of gaming machine 100/300 may optionally display a post-battle screen, which may present the player with the ability to use any virtual credits earned during the course of the feature game, for example.

Figure 17:
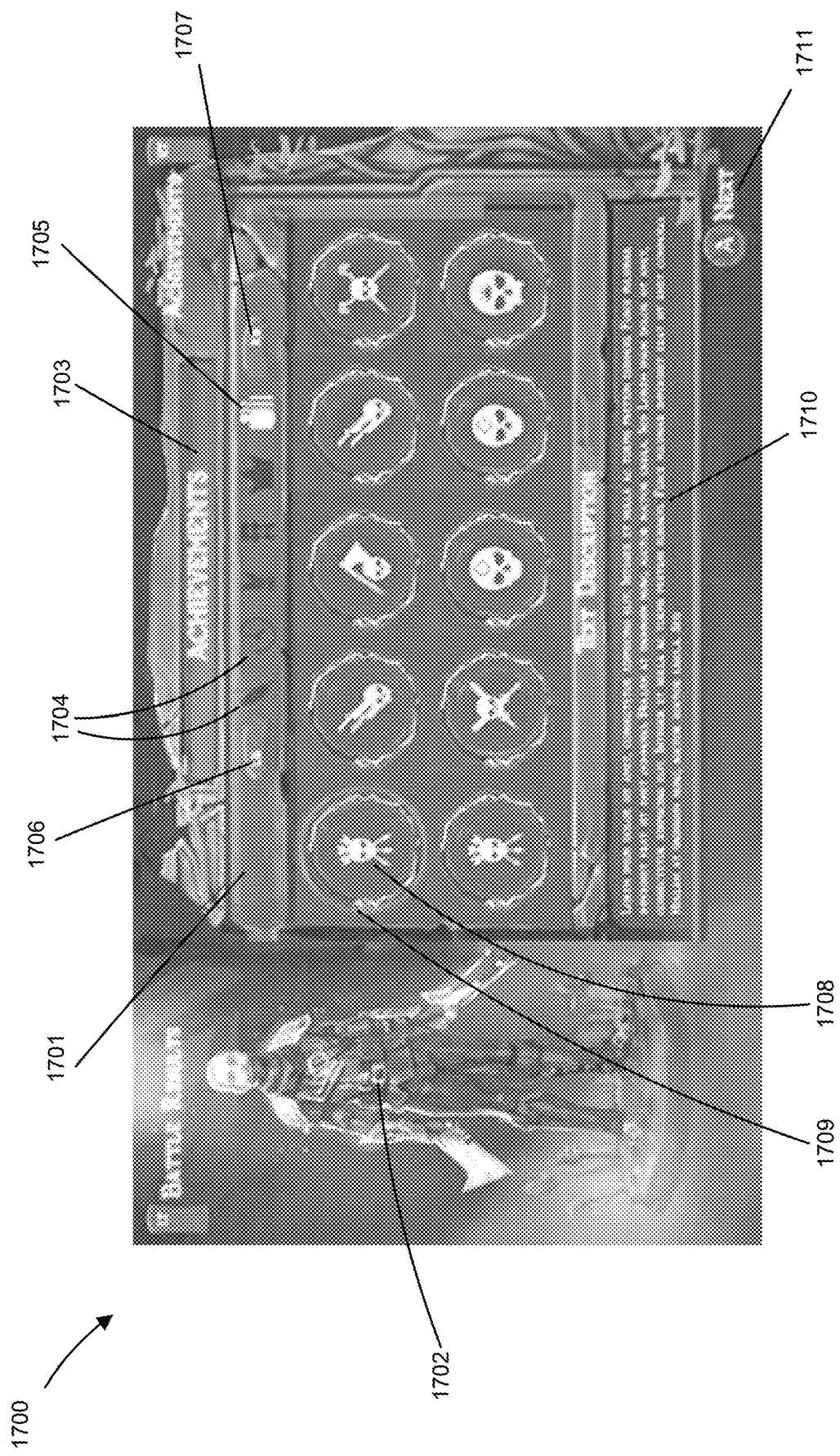
FIG. 17 is an example screenshot of an achievement screen.
Figure 18:
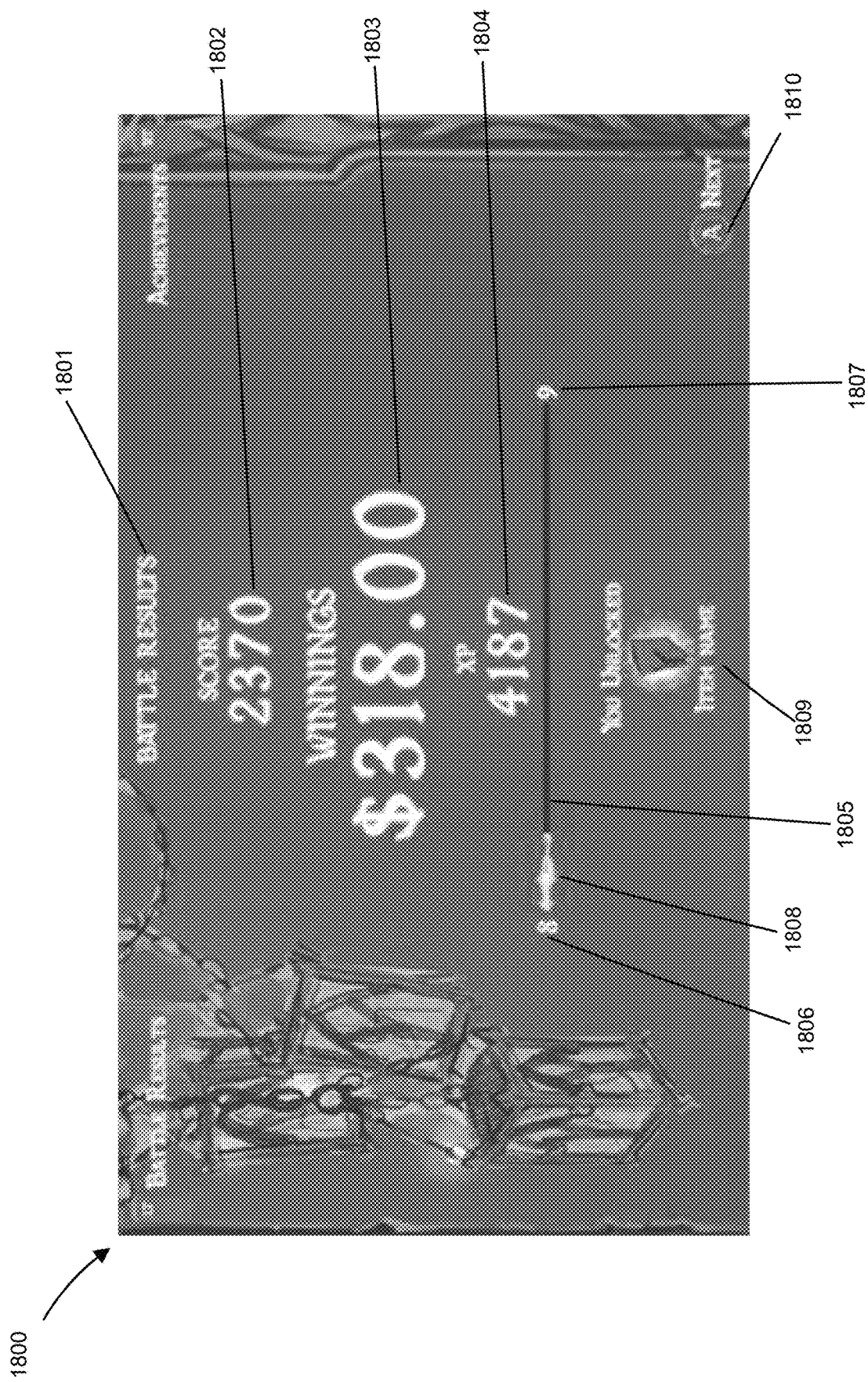
FIG. 18 is an example screenshot of a feature game achievement summary display.

After viewing the post-battle results, at step 1610 video display 104 of gaming machine 100/300 may optionally display an achievements screen such as screen 1700 as shown in FIG. 17 or screen 1800 as shown in FIG. 18, which may display statistics about the game play during the feature game, achievements earned and prize money won. After viewing achievements, processor 202 may cause video display 104 to present the inventory screen again at step 1612 according to some embodiments, to give the player the opportunity to edit the inventory associated with the player's avatar. After display of the inventory screen, the sequence of gameplay reverts to step 1605 where processor 202 causes gaming machine 100/304 to present the player with the base game again via video display 104.

A specific example of the method 500 and 1600 of gaming is described below with reference to screenshots of the display of the gaming system 100 shown in Figures to 6 to 15, 17 and 18.

Figure 6:
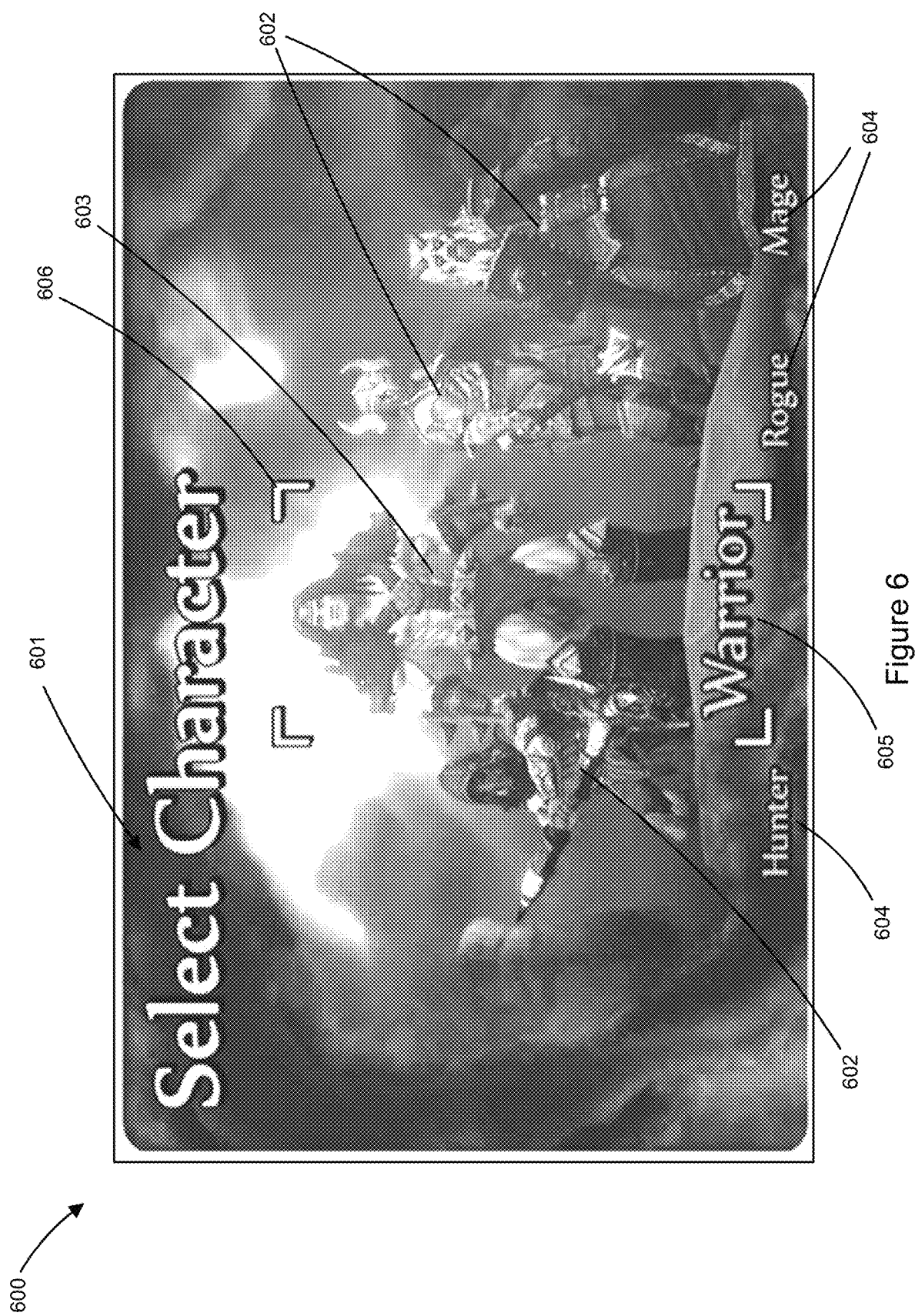
FIG. 6 is an example screenshot of a character selection screen.

FIG. 6 is an example screenshot of a character selection screen 600 of gaming machine 100, as generated by character generation module 414 based on information read by processor 202 from character data 405. Screen 600 shows a message 601 instructing a player of gaming machine 100 to select a character. A number of characters 602 may be displayed for selection. Each character has a character type descriptor 604 (such as warrior, hunter, rogue or mage, for example). The player may scroll through the characters using user input 218. As the player scrolls through the available characters 602, one character may appear as the "selected" character 603 at any given time. The selected character 603 is shown as being in front of unselected characters 602, and is shown highlighted by virtual markings 606. The name of the selected character 605 may appear bigger, in a different colour, or otherwise distinguishable from the names of the unselected characters 604. Once the player has scrolled to their desired character, they may use user input 218 to confirm their selection and exit the character selection page.

Figure 7:
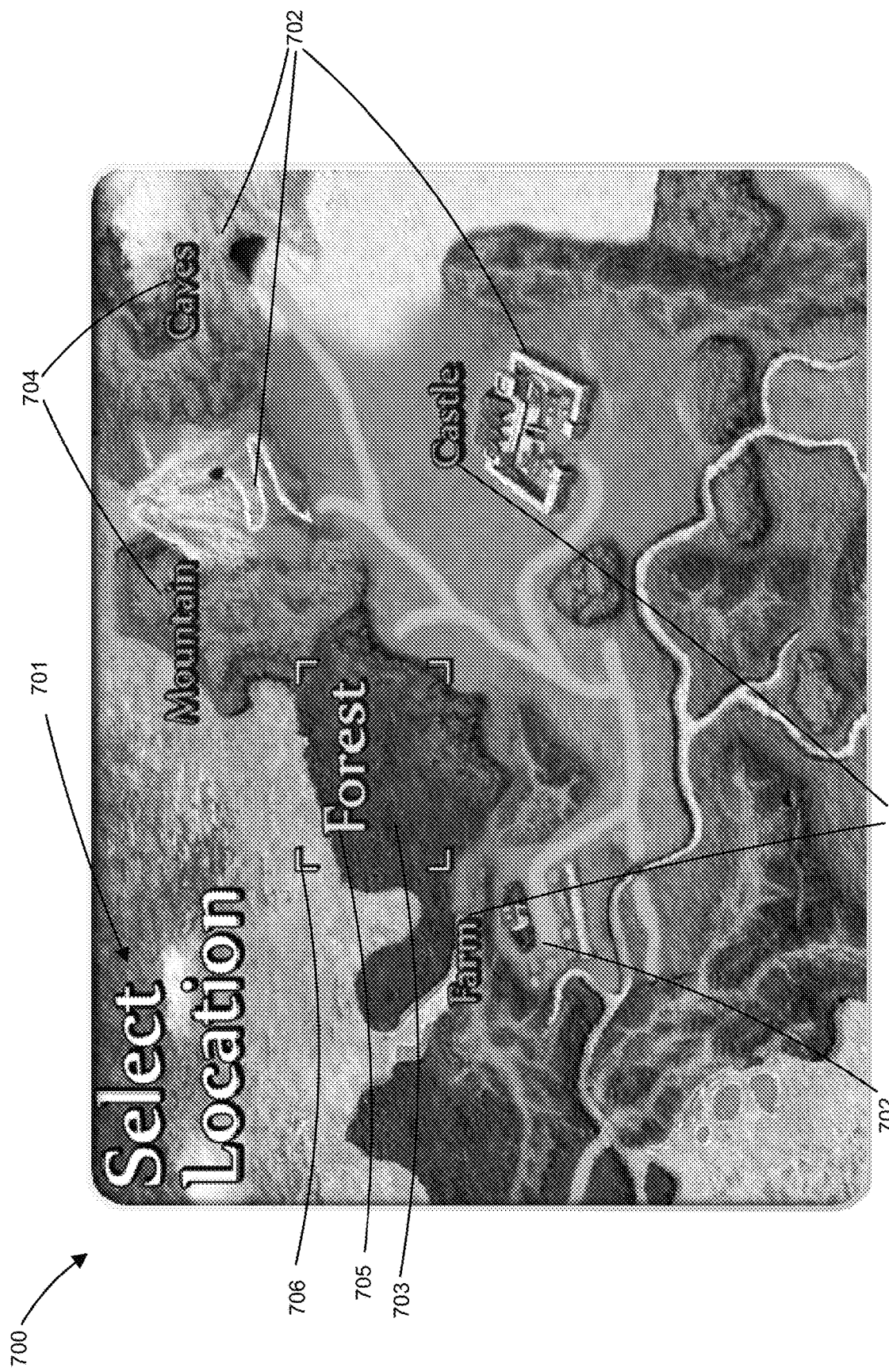
FIG. 7 is an example screenshot of a virtual location selection screen.

FIG. 7 is an example screenshot of a virtual location selection screen 700 of gaming machine 100, as generated by virtual location generation module 415 based on information read by processor 202 from virtual location data 406. Screen 700 displays a message 701 instructing a player of gaming machine 100 to select a location. A number of locations 702 are displayed for selection. Each location has a location name or descriptor 704. The player may be able to scroll through the locations using user input 218. As the player scrolls through the available locations 702, one location may appear as the "selected" location 703 at any given time. The selected location is shown highlighted by virtual markings 706. The name of the selected location 705 may appear bigger, in a different colour, or otherwise distinguishable from the names of the unselected locations 704. Once the player has scrolled to their desired location, they may use user input 218 to confirm their selection and exit the location selection page.

Figure 8:
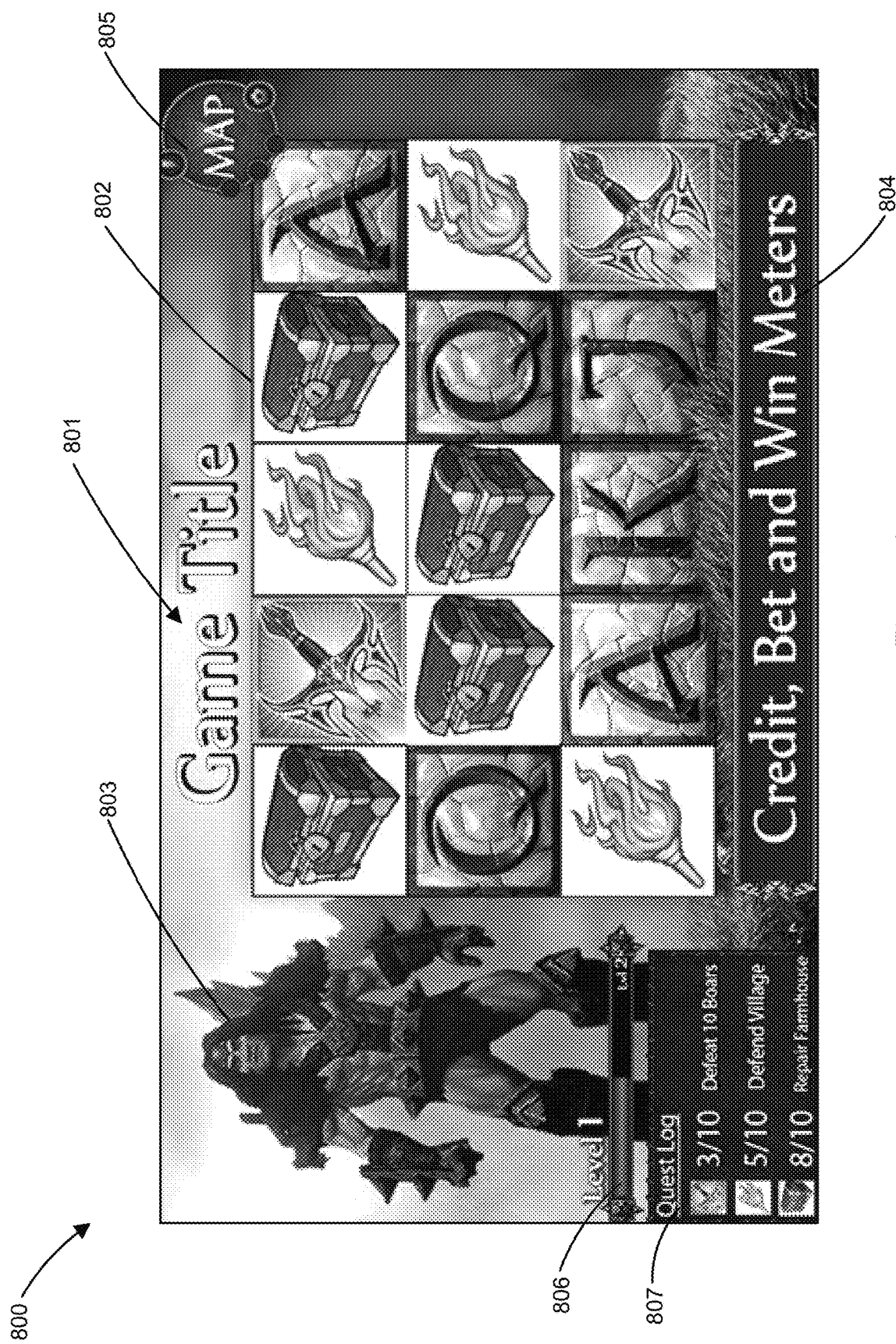
FIG. 8 is an example screenshot of a base game screen.

FIG. 8 is an example screenshot of a base game screen 800 of gaming machine 100, as generated by base game module 411 based on information read by processor 202 from symbol data 401. Screen 800 displays a game title 801 and symbol sets 802 for a base game. Symbol sets 802 are described in further detail below with reference to FIGS. 9 and 10. Screen 800 also displays a selected character 803, and credit, bet and win meters 804 which may display an amount of credit that a player has, an amount bet, and an amount won in a particular gaming session. Selected character 803 may be a character selected by the player using character selection screen 600. Screen 800 may have a map selection virtual button 805, which may be used to go back to virtual location selection screen 700. Screen 800 also shows level indicator 806 and quest log 807. Level indicator 806 and quest log 807 are described in further detail below with reference to FIGS. 11 to 12C.

Figure 9:
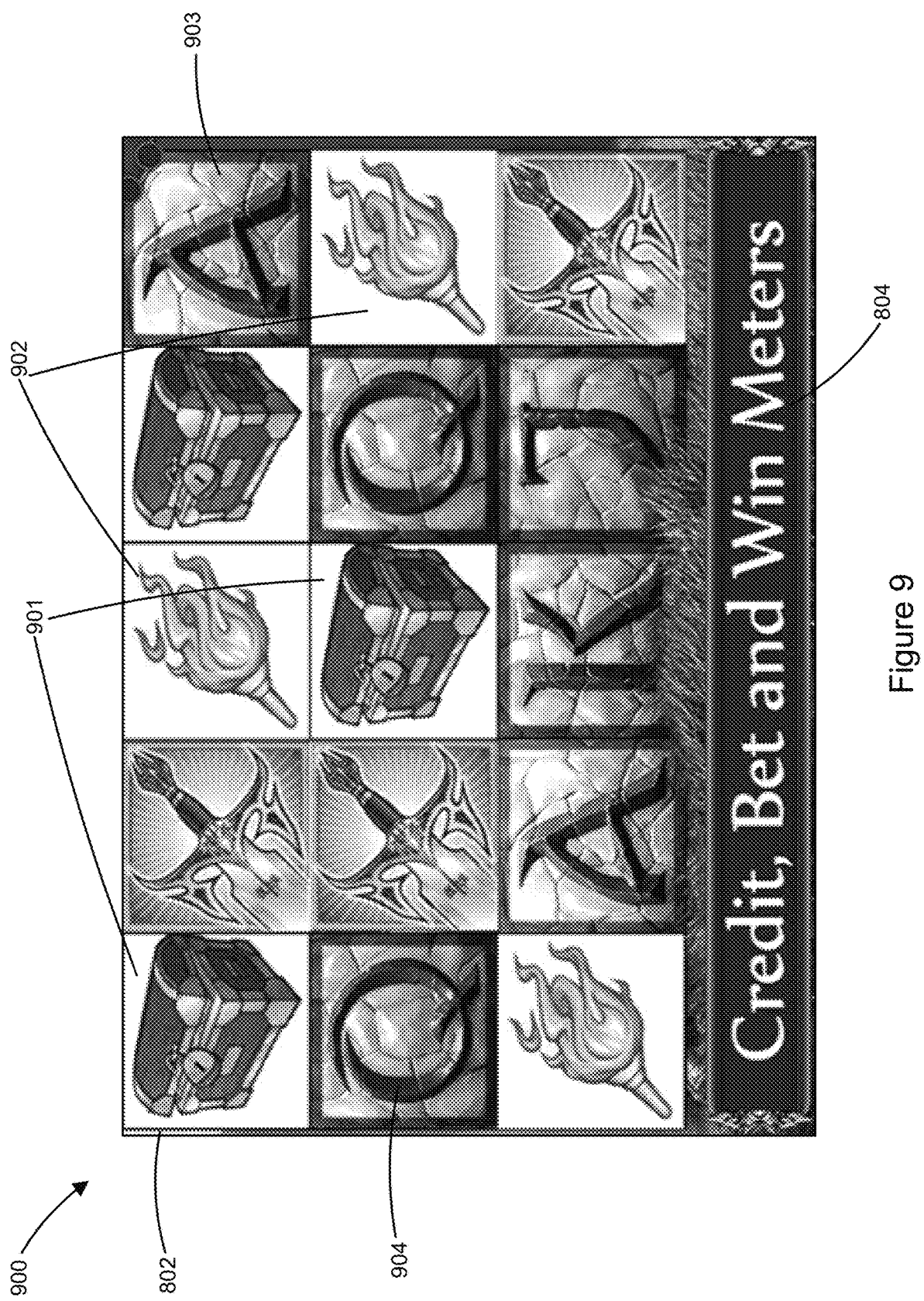
FIG. 9 is a detailed view of the symbol sets shown in FIG. 8.

FIG. 9 is a detailed view 900 of symbol sets 802. Symbol sets 802 display a number of symbols as generated by processor 202 based on symbol data 401. The symbols may include pictorial symbols, such as treasure chest symbol 901, torch symbol 902, and sword symbol 905 as well as alphanumeric symbols, such as A symbol 903 and Q symbol 904. In some embodiments, the alphanumeric symbols may correspond to cards from a standard deck of cards, such as Ace and Queen for A and Q respectively.

Figure 10:
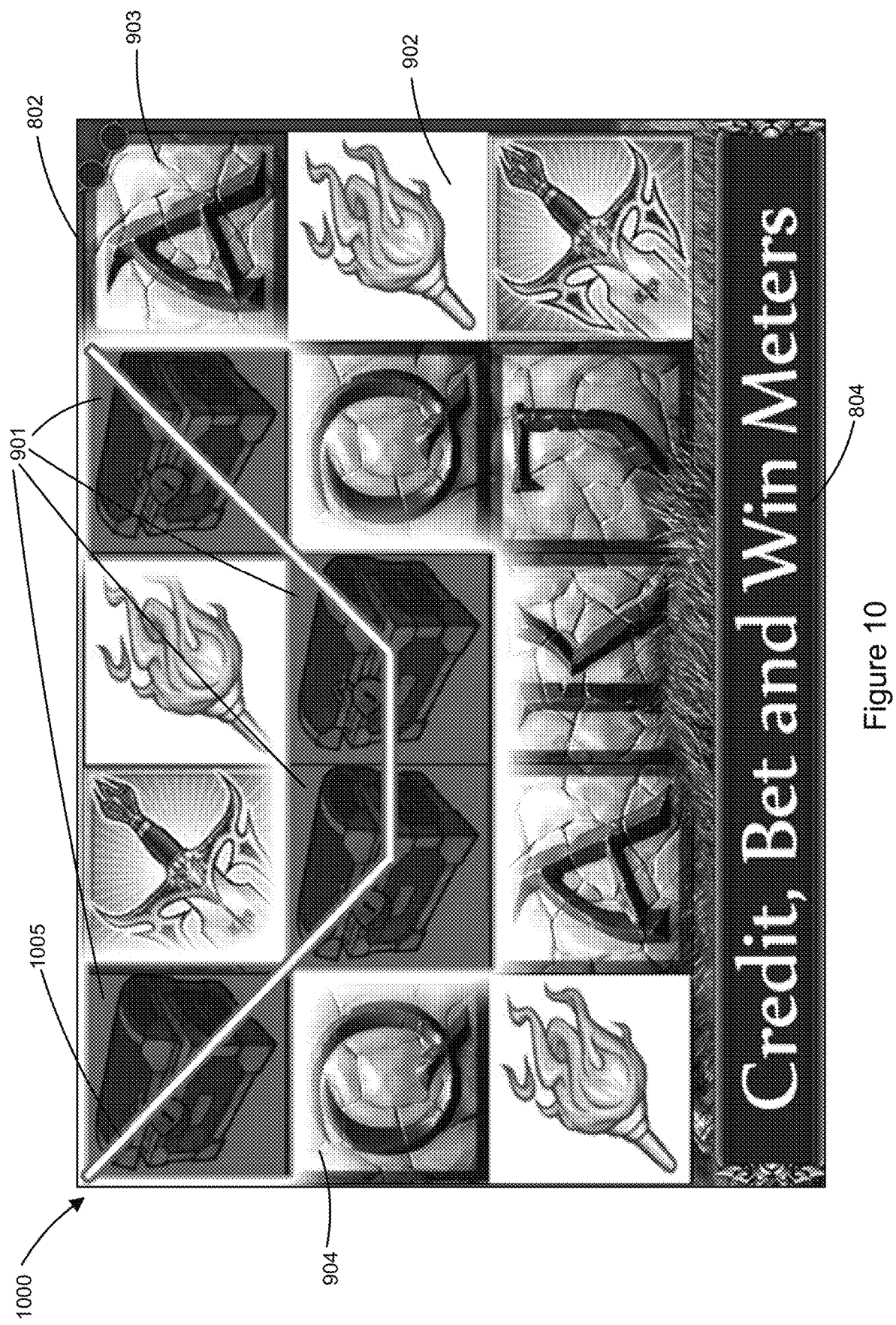
FIG. 10 is an example screenshot of a base game screen.

FIG. 10 is an example screenshot of a base game screen 1000 of gaming machine 100 showing a winning pay-line 1005 as determined by processor 202 based on base game pay-table data 402. The winning pay-line may appear on symbol sets 802 when the player of gaming machine 100 places a bet and causes symbol sets 802 to generate a set of symbols for display. Four treasure chest symbols 901 are shown intersecting the winning pay-line. The remaining symbols, including symbols 902, 903 and 904 are shown not intersecting the winning pay-line. The winning pay-line may result in the player winning an amount of cash, credits, or other awards from gaming machine 100. In some embodiments the winning pay-line may also result in progress in the meta-game, as described in further detail below with reference to FIGS. 11 to 12C.

Figure 11:
FIG. 11 is an example screenshot of a meta-game task screen.

FIG. 11 is a detailed view 1100 of quest log 807. Quest log 807 tracks a players progression through a meta-game, as controlled by meta-game module 412 based on information from meta-game task data 404, during the play of the base game displayed on symbol sets 802. Quest log 807 shows a number of quests 1101, described as tasks to be completed during the meta-game. The tasks may be tailored to the character, the game scenario and/or the virtual location of the game selected by the player. For example, if a farm location is selected, tasks may include "Defeat 10 boars", "Defend village", and "Repair farmhouse", for example. Each task may be displayed next to a symbol 1102. In some embodiments, the symbols displayed may correspond to symbols of the symbol sets 802, and may be related to the symbols that need to appear on symbol sets 802 in order to complete the tasks. The tasks or quests may include a progress meter 1103, which may show how many more successful symbol appearances are required until the task is completed. Processor 202 may determine what amounts to a successful symbol appearance based on meta-game pay-table data 403. For example, in the illustrated embodiment, each task requires 10 successful symbol appearances to become completed. The "Defend 10 Boars" task has been completed 3 times out of a required 10 times. The "Defend village" and "Repair farmhouse" tasks have been completed 5 and 8 times out of a required 10 times, respectively. In some embodiments, once each or all of the quests have been completed, the player's character may be caused to move up a level, or acquire an increased set of abilities or attributes. In some embodiments, the player may alternatively or in addition be caused to move up a level, or acquire an increased set of abilities or attributes, during the playing of the feature game, by completing objectives or earning points during the feature game.

FIG. 12A is a detailed view of quest log 807, showing a task being completed. The "Defeat 10 boars" task 1201 is highlighted, as 10 of the 10 required successful symbol appearances have been achieved. Incomplete tasks 1202 are not highlighted.

FIG. 12B is a detailed view of level indicator 806. Level indicator 806 shows a current level 1203 of the player's character, which is Level 1 in the illustrated embodiments. Level indicator 806 also shows a progress bar 1204, showing how much more progress is required in the meta-game and/or in the feature game before the character reaches the next level. Level indicator 806 also displays the next level 1205 for the character to achieve.

FIG. 12C shows an example screenshot of symbol sets 802 showing a winning combination of symbols 1206 as determined by processor 202 based on meta-game pay-table data 403, highlighting a winning meta-game combination. Symbols that are not part of the winning combination, such as symbols 1207, are not highlighted. Based on the combination of symbols that appear on symbol sets 802, processor 202 determines, based on meta-game pay-table data 403, whether the symbol combinations are winning combinations. A winning combination may result in one or more tasks 1101 (i.e. meta-game objectives) being completed in some embodiments, or progress being made towards the completion of one or more tasks.

Figure 13:
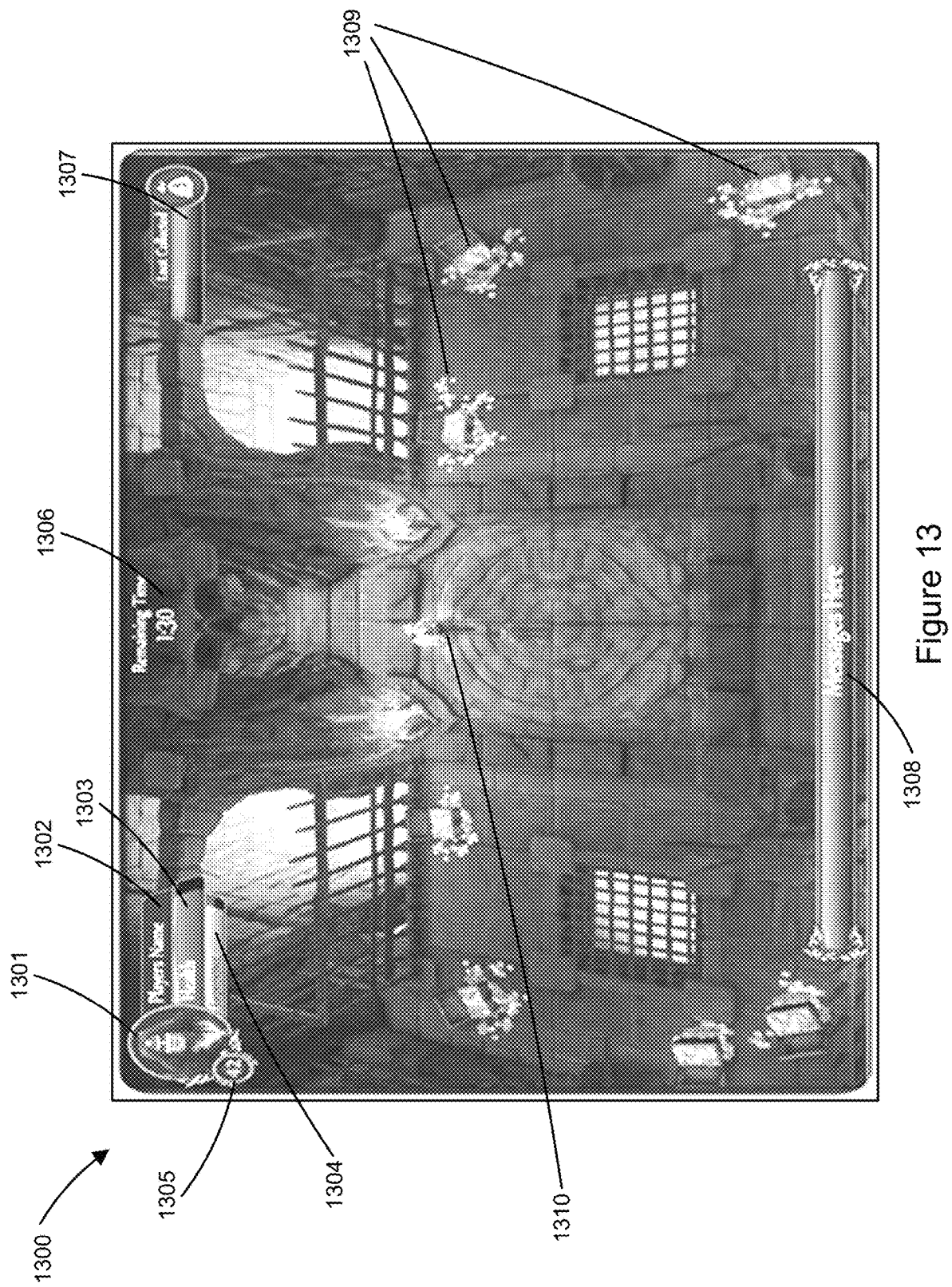
FIG. 13 is an example screenshot of a feature game screen.

FIG. 13 is an example screenshot of a feature game screen 1300 of gaming machine 100. Screen 1300 includes a character information display portion, including an image of the character 1301, the character name 1302, an indication of the character's health 1303, an indication of the character's experience 1304, and a skill score achieved by the player 1305, stored in memory as skill score data 409. Screen 1300 also shows a countdown timer 1306 showing the time remaining for a player to navigate through the virtual environment in order to collect rewards before the feature game ends. In some embodiments, the feature game may end when timer 1306 runs out, or when the player's health 1303 runs out, whichever occurs first. The amount of rewards collected by the player is shown by reward meter 1307. Collecting rewards may also contribute to an increase in the player skill score 1305. Messages may be displayed to a player playing the feature game using message bar 1308. As the player navigates character 1310 through the virtual environment shown using user input 218, the character may interact with objects in the environment, such as treasure chests 1309 or other reward-triggering objects. Opening treasure chests 1309 may allow the player to accumulate rewards, including non-monetary rewards such as by collecting skill points to increase their skill score 1305, or other awards. In some embodiments, the rewards may be transferrable for cash or credits at the end of the game. In some embodiments, chests 1309 may contain other non-monetary rewards, which may be aesthetic or game-influencing, such as clothing, weapons, or other modifications to the character 1310. In some embodiments, the player may also be able to interact with other characters or objects in the feature game, such as by fighting bosses, villains or monsters, opening locks or doors, tripping traps, or solving puzzles, for example. The skill score 1305 may be calculated and displayed in real-time in response to the actions of the player, as calculated by skill score determination sub-module 417, described above. According to some embodiments, a monetary payout amount as calculated based on a current skill-score may also be calculated and displayed in real-time.

FIG. 17 is an example screenshot of an achievement screen 1700 of gaming machine 100. Processor 202 may be configured to cause the display of screen 1700 after play of the feature game is completed, to show scores, achievements, and money won during the feature game. Screen 1700 shows an achievements board 1701 and a representation of a player's character or avatar 1702. Achievements board 1701 has a title 1703, and a series of selectable pages 1704, including a currently selected page 1705. The symbol for the currently selected page is shown as visually highlighted. A player may be able to scroll or flip through pages 1704 using controls 1706 and 1707. The selected page 1705 shows a number of achievement icons 1708 as well as a progress meter 1709 for each achievement. Progress meter 1709 may show how far the player is from a particular achievement. For example, if one achievement is to defeat 10 enemies, and the player defeated 5 enemies, progress meter 1709 may be half full for that achievement. A text description 1710 of each achievement 1708 may also be displayed when the player highlights or selects the achievement.

Once the player has finished viewing the player's achievements, the player may activate virtual button 1711 to proceed to the next screen, which may cause processor 202 to display a results screen on gaming machine 100/304. The results screen may be a battle results screen 1800 as described below with reference to FIG. 18.

FIG. 18 is an example screenshot of a battle results screen 1800 of gaming machine 100. Screen 1800 may be displayed by processor 202 after play of the feature game, and in some embodiments after display of achievement screen 1700. Screen 1800 may be configured to display the results of a feature game, which may include scores, points, achievements, and money won during the feature game. Screen 1800 shows a battle result heading 1801, with a score indicator 1802 and a winnings amount indicator 1803. Score indicator 1802 may display a skill score retrieved from skill score data 409, which may be determined by processor 202 during play of the feature game as described above with reference to step 513 of method 500. Winnings amount indicator 1803 may display a dollar value corresponding to the payout amount won by the player during play of the feature game, calculated by processor 202 as described above with reference to step 514 of method 500.

Screen 1800 also displays an experience points indicator 1804 and a level progress bar 1805. Experience points indicator 1804 may display the number of experience points the player's avatar has earned. Experience points may be calculated during the play of the feature game, and may contribute to the level of the player's avatar. According to some embodiments, experience points may be calculated based on rules defined by feature game module 411. For example, feature game module 411 may define a rule that a player's avatar is to be awarded five experience points if it defeats an enemy in the feature game. According to some embodiments, processor 202 may modify the stored number of experience points every time a triggering event occurs within the feature game. A triggering event may be any event that has been predetermined according to stored event rules to alter the experience points. This may include an occurrence, action or achievement (either success or failure) by the character or avatar, such as defeating an opponent, finding a hidden item, using a consumable, or receiving damage, for example.

Level progress meter 1805 may show a player the progress they have made to cause an increment in the level of the player's avatar. Level progress meter 1805 may show a current level 1806 and a next level 1807, with a progress bar 1808 visually depicting how far the avatar is from getting to next level 1807. For example, in the illustrated embodiment, the avatar is around ⅐ of the way to getting from level 8 to level 9. According to some embodiments, the player level may be dependent on experience points earned. For example, a level increase of the player's avatar may occur when the avatar achieves a predetermined number of experience points gained through achievements of the avatar in the feature game. In the illustrated embodiment, the player avatar may need to achieve 5000 points before the avatar's level is incremented to level 9.

According to some embodiments, screen 1800 may also display an unlocked items indicator 1809. The unlocked items indicator 1809 may display one or more items that are now available to the player to purchase for the avatar's inventory. Items may be unlocked based on the score 1802, winnings 1803 or experience points 1804 achieved by the avatar during play of the feature game, or may be based on specific actions or achievements of the avatar during the feature game, such as defeating a predetermined number of opponents (such as 5 opponents), for example. The items may include aesthetic items or game-influencing items, such as clothing, weapons, potions or modifications to the character 1310.

Once the player has finished viewing battle results 1801, the player may activate virtual button 1810 to proceed to the next screen, which may cause gaming machine 100/304 to display a prize pool screen as described below with reference to FIGS. 14 and 19.

Figure 14:
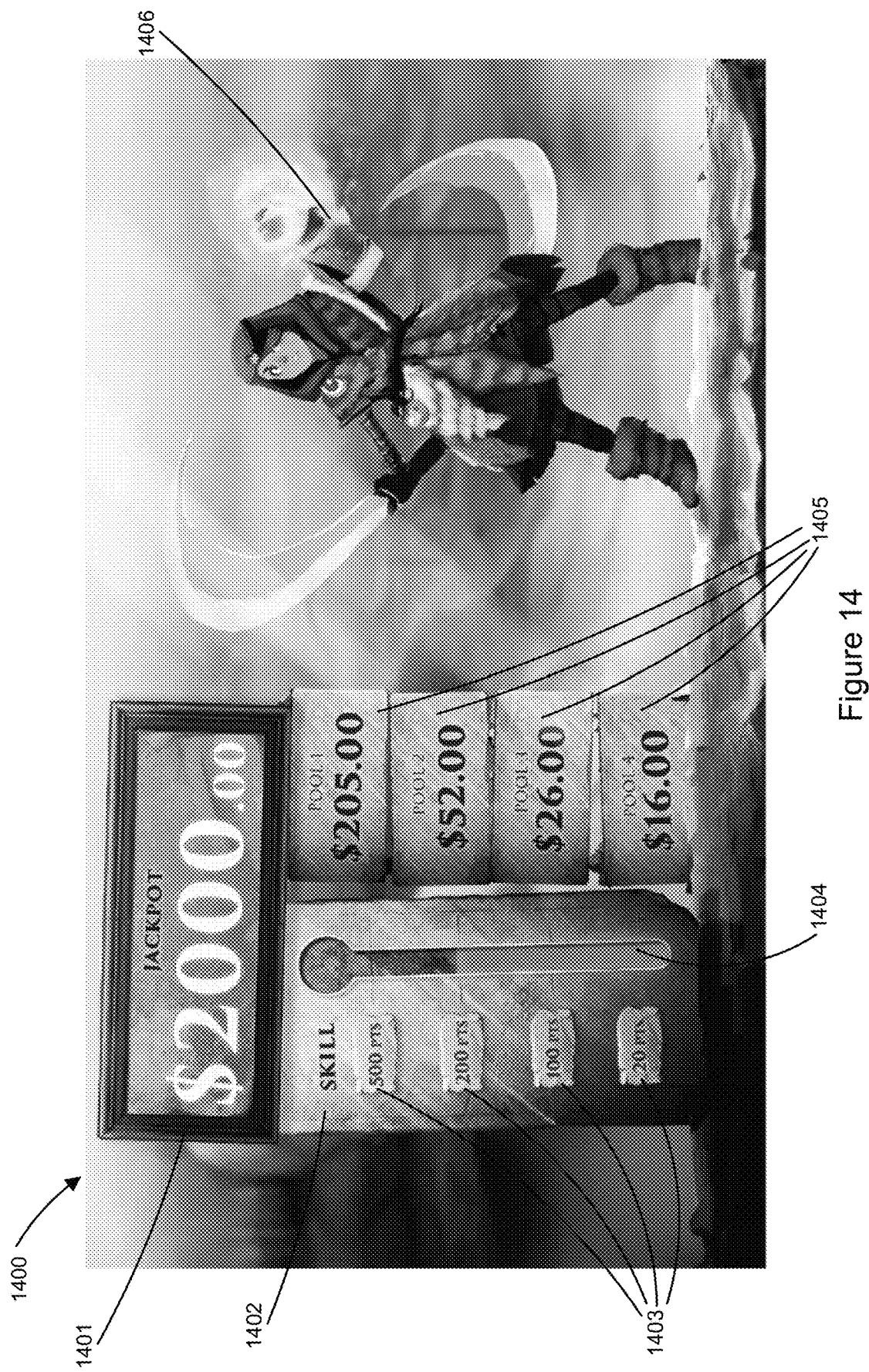
FIG. 14 is an example screenshot of a multi-stage prize pool of the feature game.

FIG. 14 shows a screenshot 1400 displaying a multi-stage prize pool of the feature game that may be used to calculate a payout to a player based on skill score data 409, as described above with reference to step 514 of method 500. Screenshot 1400 shows the major jackpot value 1401, a skill score meter 1402 having skill score levels 1403, a skill score value bar 1404, prize pool segment values 1405 and an avatar 1406. Avatar 1406 may show the current appearance of the avatar of the player.

Jackpot display 1401 may show a monetary amount which may be the amount of money in the percentage based prize pool as described below with reference to FIG. 15. The percentage based prize pool may be triggered instead of the multi-stage prize pool in some embodiments, based on the appearance of a particular trigger symbol in game play outside of the (feature) skill game. Skill score meter 1402 may be used to display a player's skill score as determined during play of the feature game, in relation to a number of monetary values that the player may be eligible to win. In particular, skill score levels 1403 are used to display a number of skill score values that correspond to segments of the multi-stage prize pool. Skill score levels 1403 may correlate with a skill score range associated with the prize pool segments. Each skill score bracket may correspond to a particular payout amount to be awarded to the player. Skill score value bar 1404 depicts the skill score visually, and may be in the form of a shape that is partially filled with a colour or shade to correlate to the value of the skill score achieved.

Prize pool segment values 1405 may be determined by processor 202 based on values stored in prize pool meter 230, and may be calculated as a percentage of a multi-stage prize pool meter value, or may be stored as independent values in prize pool meter 230. When a player wins a particular prize pool segment, that prize pool segment may be reseeded with money from a secondary prize pool as stored in prize pool meter 230, and the associations between each prize pool and each skill score range may be modified so that the monetary value of each prize pool segment is related to the skill score range associated with that prize pool segment.

For example, in the illustrated embodiment, a player has achieved a skill score of 200 points, winning Pool 2, being $52.00. Once this has occurred, Pool 2 will be reseeded with a monetary amount to a base level, which may be $5.00, for example. The base level will be the lowest (default) level, so when the prize pool is reordered from lowest to highest, the pool that was just won will be re-ordered to the bottom of the list, becoming Pool 4. The monetary amount reseeded may be taken from a supplementary pool that is not available for winning by the player. Original Pool 4 will be pushed up and become Pool 3, and original Pool 3 will be pushed up and become Pool 2.

In an alternative embodiment, if a player wins Pool 2, Pool 2 will be replenished with the $26.00 from Pool 3, and Pool 3 will be replenished with the $16.00 from Pool 4. Pool 4 is reseeded with a default minimum monetary amount. This minimum amount may be taken from the secondary prize pool, which may be $5.00, for example. When the player re-enters the base game, any wagers placed by the player are used to increase each of Pools 1, 2, 3, and 4, as well as adding to the secondary prize pool stored in prize pool meter 230.

If an RTP levelling event occurs, a player may be awarded the amounts in each of Pools 1, 2, 3 and 4, being a total of $299.00 in the illustrated embodiment.

Figure 19:
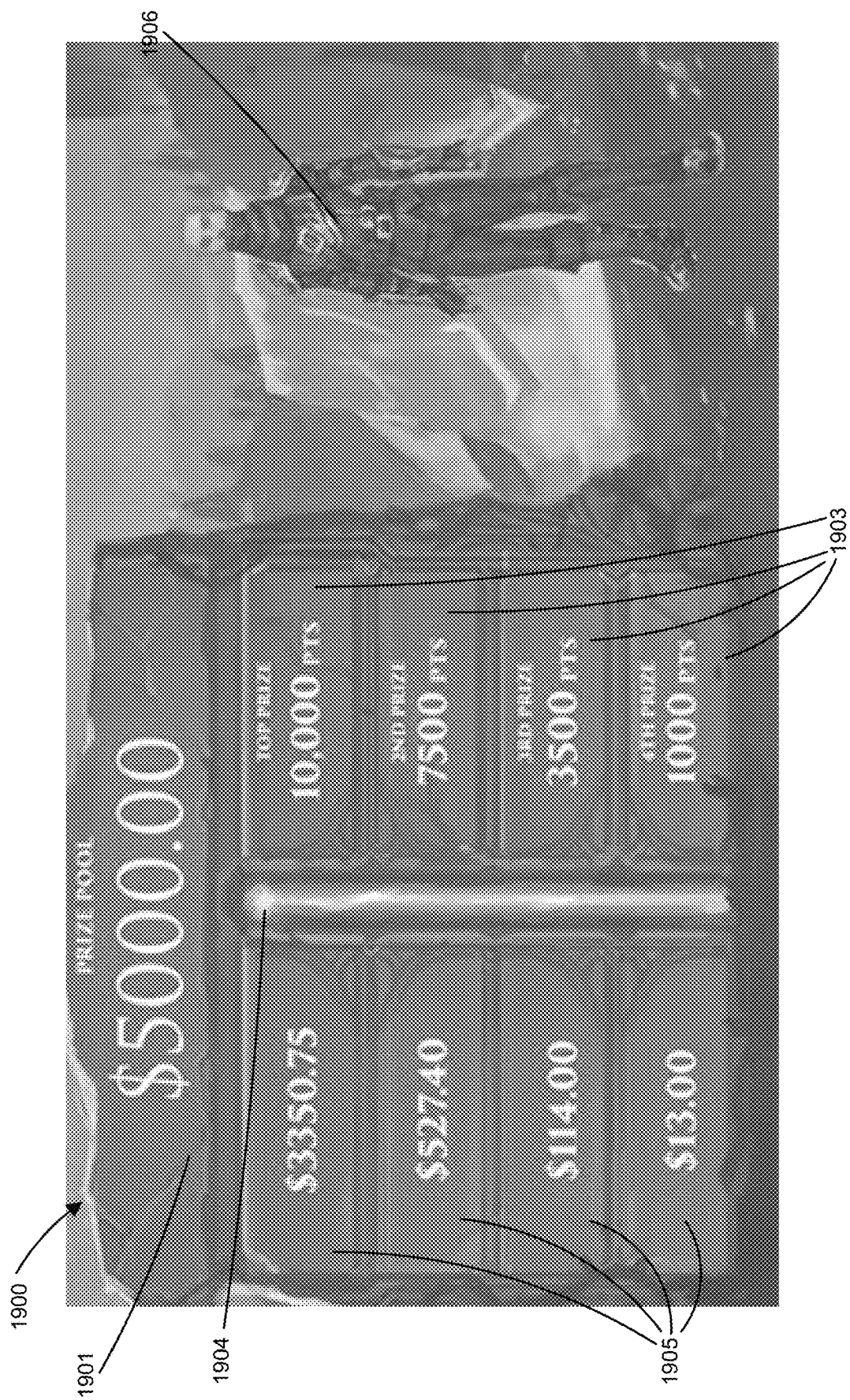
FIG. 19 is an example screenshot of a feature game battler results display.

FIG. 19 shows a screenshot 1900 displaying an alternative multi-stage prize pool of the feature game that may be used to calculate a payout to a player based on skill score data 409, as described above with reference to step 514 of method 500. Screenshot 1900 shows the major jackpot value 1901, skill score levels 1903, a skill score value indicator 1904, prize pool segment values 1905 and an avatar 1906. Avatar 1906 may show the current appearance of the avatar of the player.

Jackpot display 1901 may show a monetary amount which may be the amount of money in the percentage-based prize pool as described below with reference to FIG. 15. The percentage-based prize pool may be triggered instead of the multi-stage prize pool in some embodiments, based on the randomised occurence of a particular trigger symbol in game play outside of the (feature) skill game. Skill score levels 1903 and skill score value indicator 1904 may be used to display a player's skill score as determined during play of the feature game, in relation to a number of monetary values that the player may be eligible to win. In particular, skill score value indicator 1904 may be displayed as a bar with skill score levels 1903 used to display a number of skill score values that correspond to segments of the multi-stage prize pool. Skill score levels 1903 may correlate with a skill score range associated with the prize pool segments. Each skill score bracket may correspond to a particular payout amount to be awarded to the player. Skill score value indicator 1904 depicts the skill score visually, and may be in the form of a shape or contour that is partially filled with a colour or shade to correlate to the value of the skill score achieved, for example.

Prize pool segment values 1905 may be determined by processor 202 based on values stored in prize pool meter 230, and may be calculated as a percentage of a multi-stage prize pool meter value, or may be stored as independent values in prize pool meter 230. When a player wins a particular prize pool segment, processor 202 may cause that prize pool segment to be reseeded with money from a secondary prize pool as stored in prize pool meter 230, and to modify the associations between each prize pool and each skill score range so that the monetary value of each prize pool segment is related to the skill score range associated with that prize pool segment.

For example, in the illustrated embodiment, a player has achieved a skill score of over 10,000 points, winning Pool 1, being $3350.75. Once this has occurred, processor 202 is configured to reseed Pool 1 with a monetary amount to a base level, which may be $5.00, for example. The base level will be the lowest (default) level, so processor 202 reorders the prize pool from lowest to highest, processor 202 re-orders the pool that was just won (in this case, Pool 1) to the bottom of the list, becoming Pool 4. The monetary amount reseeded may be taken from a supplementary pool that is not available for winning by the player. Processor 202 causes original Pool 4 to be visually raised up to the second position from the bottom and renamed Pool 3, original Pool 3 to be visually raised up to the third position from the bottom and renamed Pool 2, and original Pool 2 to be visually raised up to the highest position and renamed Pool 1.

In an alternative embodiment, if a player wins Pool 2, processor 202 replenishes Pool 2 with the current amount ($114.00) from Pool 3, and replenishes Pool 3 with the current amount ($13.00) from Pool 4. Processor 202 also reseeds Pool 4 with a default minimum monetary amount.

This minimum amount may be taken from the secondary prize pool, which may be $5.00, for example. When the player re-enters the base game, any wagers placed by the player are divided and used to increase each of Pools 1, 2, 3, and 4, as well as adding to the secondary prize pool stored in prize pool meter 230.

If an RTP levelling event occurs (as described above with reference to at step 509 of FIG. 5), a player may be awarded the total amounts in all of Pools 1, 2, 3 and 4, being a summed total of $4005.15 in the illustrated embodiment.

Figure 15:
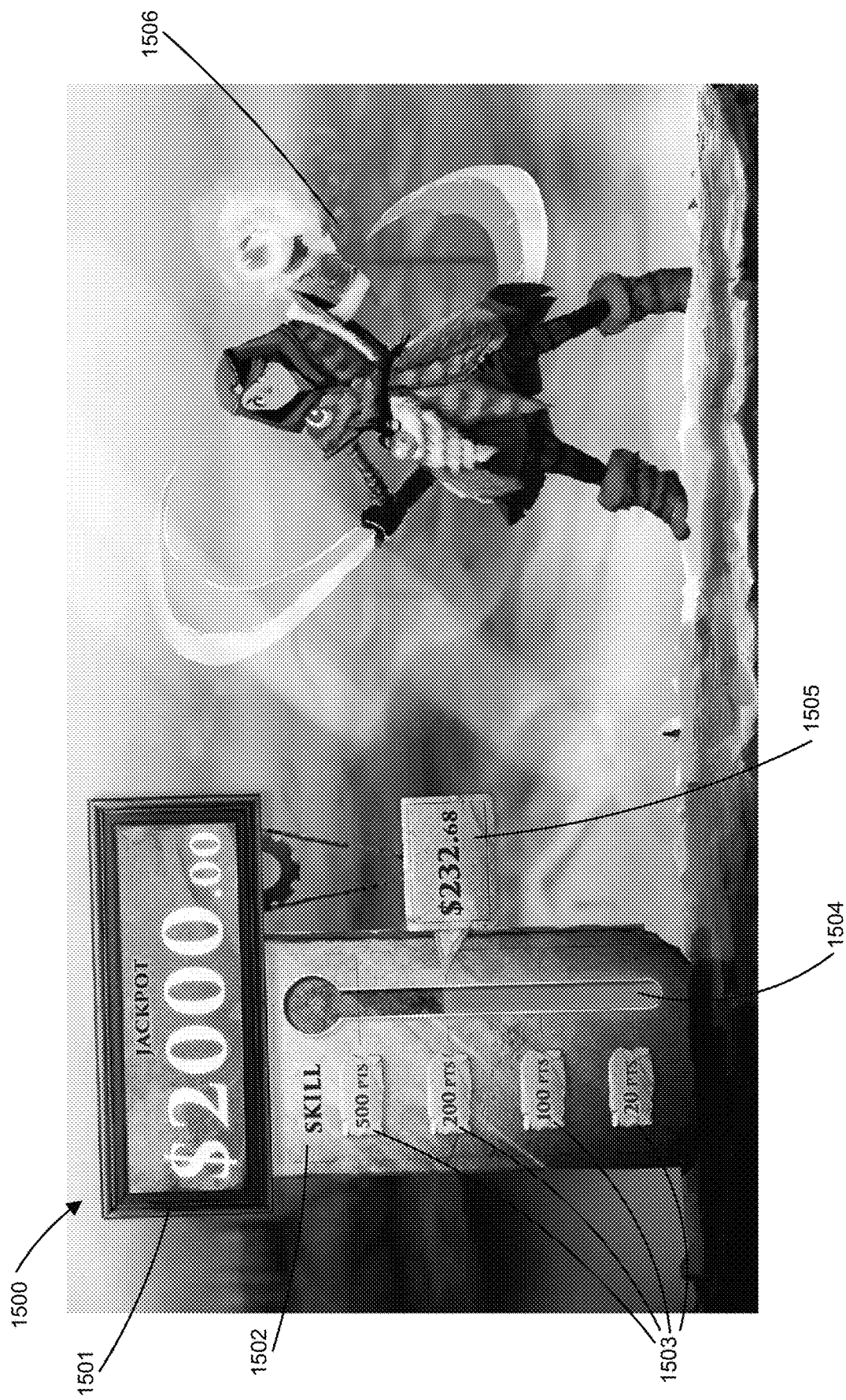
FIG. 15 is an example screenshot of a percentage based prize pool of the feature game.

FIG. 15 shows a screenshot 1500 displaying a percentage based prize pool of the feature game that may be used to calculate a payout to a player based on skill score data 409, as described above with reference to step 514 of method 500. Screenshot 1500 shows the major jackpot value 1501, a skill score meter 1502 having skill score levels 1503, a skill score value bar 1504, a percentage prize pool value 1505 and an avatar 1506. Avatar 1506 may show the current appearance of the avatar of the player.

Jackpot display 1501 may show a monetary amount which may be related to a maximum monetary prize that can be won by a player in the feature game when the percentage based prize pool is triggered. According to some embodiments, the percentage-based prize pool may be triggered instead of the multi-stage prize pool when a specific symbol or symbol combination is displayed during the game of chance. According to some embodiments, the percentage-based prize pool may be triggered based on the occurrence of another random event. According to some embodiments, the percentage prize pool may be used instead of the multi-stage prize pool based on a pseudo-random event (e.g. a random event contingent on a no-random event), such as a randomly generated result after the player makes a selection or takes a certain action. For example, the percentage prize pool may be triggered when, after defeating a particular opponent during the skill based game, a randomly generated result determines that the percentage prize pool should be used.

Skill score meter 1502 may be used to display a player's skill score as determined during play of the feature game, in relation to a percentage of a prize pool the player may be eligible to win. In particular, skill score levels 1503 are used to display a number of skill score values that correspond to percentages of the percentage based prize pool, such as 25%, 50%, 75% and 100%, for example. Each skill score bracket may correspond to a particular payout percentage to be awarded to the player. Skill score value bar 1504 depicts the skill score visually, and may be in the form of a shape that is partially filled with a colour or shade to correlate to the value of the skill score achieved.

Prize pool segment value 1505 may be determined as a percentage of the percentage based prize pool value stored in prize pool meter 230, and may be calculated based on the skill score bracket that the player's skill score falls into. According to some embodiments, prize pool segment value 1505 may display a percentage rather than the monetary amount corresponding to the percentage. When a player wins a particular percentage of the prize pool, the prize pool may be decremented by the corresponding amount. If a player wins 100% of the prize pool, the prize pool may be reseeded with money from a secondary prize pool as stored in prize pool meter 230.

For example, in the illustrated embodiment, a player has achieved a skill score of 200 points, winning $232.68 of the prize pool, which may correspond to 75% of the prize pool, for example. Once this has occurred, the prize pool is decreased by $232.68, leaving only 25% of the original prize pool, which would be $77.56 in the present example. When the player re-enters the base game, a proportion of any wagers placed by the player are used to increase the prize pool amount.

If an RTP levelling event occurs, a player may be awarded 100% of the prize pool, which may be $370.24 in the present example, and the prize pool may be reseeded from the secondary prize pool, as described above.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Embodiments disclosed herein comprise the following numbered embodiments:

1. A gaming machine comprising:
    a display;
    a memory storing a set of game instructions;
    at least one input mechanism configured to receive user input from a player; and
    a game controller configured to access and execute the instructions stored in the memory to:
       present at least one game of skill on the display;
       enable a player to control an avatar to perform the game of skill by operating the at least one input mechanism;
       in response to a triggering event, determine a skill score based on at least one aspect of the avatar's performance in the game of skill and the set of game instructions; and
       based on the skill score, determine a monetary reward to be awarded to the player from a prize pool.

2. The gaming machine of embodiment 1, wherein the game controller is configured to present at least one game of chance on the display in response to receiving user input.

3. The gaming machine of embodiment 2, wherein the at least one prize pool is incremented based on player spend in the game of chance.

4. The gaming machine of embodiment 2 or embodiment 3, wherein the game controller is configured to present the at least one game of skill after presenting the at least one game of chance.

5. The gaming machine of embodiment 4, wherein the game controller is configured to present the at least one game of skill in response to at least one outcome of the at least one game of chance.

6. The gaming machine of any one of embodiments 2 to 5, wherein the game controller is configured to execute a meta-game, wherein the meta-game defines at least one meta-game objective and wherein progression through the meta-game towards the at least one meta-game objective is related to results of the game of chance.

7. The gaming machine of embodiment 6, wherein achievement of the at least one meta-game objective affects at least one aspect of the at least one game of skill.

8. The gaming machine of embodiment any one of embodiments 1 to 7, wherein the game controller is configured to present the at least one game of skill in response to a pre-determined condition being met.

9. The gaming machine of any one of embodiments 1 to 8, wherein the game controller is configured to present a selectable option to the user, wherein selecting the option causes the gaming controller to present the at least one game of skill.

10. The gaming machine of embodiment 9, wherein the game controller is configured to present the selectable option to the user in response to a pre-determined condition being met.

11. The gaming machine of any one of embodiments 1 to 10, wherein the monetary reward is determined based on a correlation between the skill score and a skill score range associated with the at least one prize pool.

12. The gaming machine of any one of embodiments 1 to 11, wherein the game controller is configured to randomly generate a return-to-player levelling event that causes the player who is playing at the time of the levelling event being generated to be awarded a pre-determined percentage of one or more prize pools associated with the skill based game.

13. The gaming machine of embodiment 12, wherein the return-to-player levelling event is generated before play of the game of skill commences.

14. The gaming machine of embodiment 13, wherein the percentage is between 60% and 100%.

15. The gaming machine of embodiment 14, wherein the percentage is 100%.

16. The gaming machine of any one of embodiments 12 to 15, wherein the return-to-player levelling event causes a characteristic of the avatar to change in favour of the player.

17. The gaming machine of any one of embodiments 1 to 16, wherein the at least one prize pool is divided into a plurality of prize pool segments, each prize pool segment being associated with a skill score range.

18. The gaming machine of embodiment 17, wherein the value of each prize pool segment is related to the skill score range associated with that prize pool segment.

19. The gaming machine of embodiment 17 or embodiment 18, wherein when a prize pool segment is won, that prize pool segment is reseeded with money from a secondary prize pool, and the associations between each prize pool and each skill score range are modified so that the monetary value of each prize pool segment is related to the skill score range associated with that prize pool segment.

20. The gaming machine of any one of embodiments 1 to 19, wherein the monetary reward awarded to the player is a percentage of an amount of money in a prize pool, the game controller configured to calculate the percentage based on the skill score.

21. The gaming machine of embodiment 20, wherein the skill score is determined based on the actions of the avatar in the game of skill.

22. The gaming machine of any one of embodiments 1 to 21, wherein the skill score is determined based at least in part on a number of in-game items collected by the player in the skill based game.

23. The gaming machine of any one of embodiments 1 to 22, wherein the skill score is determined based at least in part on a number of in-game opponents defeated by the player in the skill based game.

24. The gaming machine of any one of embodiments 1 to 23, wherein the skill score is determined based at least in part on a time in which a player completes a task in the skill based game.

25. The gaming machine of any one of embodiments 1 to 24, wherein the skill score is determined based at least in part on by a difficulty of an action sequence executed by the player in the skill based game.

26. The gaming machine of any one of embodiments 1 to 25, wherein the skill score is determined based at least in part on an amount of damage inflicted upon an opponent by the player in the skill based game.

27. The gaming machine of any one of embodiments 1 to 26, wherein the skill score is determined based at least in part on the use of in-game consumables by the player in the skill based game.

28. The gaming machine of any one of embodiments 1 to 27, wherein the skill score is determined based at least in part on an amount of damage inflicted upon the player in the skill based game.

28. The gaming machine of any one of embodiments 1 to 27, wherein the game controller is further configured to, based on the skill score, determine a non-monetary reward to be awarded to the player.

29. The gaming machine of any one of embodiments 1 to 28, wherein the triggering event is an action or achievement of the avatar during game play.

30. The gaming machine of any one of embodiments 1 to 28, wherein the triggering event is the completion of the feature game.

31. A method of determining a monetary reward based on an outcome of a game of skill, the method comprising:
   presenting at least one game of skill on a display of a gaming machine;
   enabling a player to control an avatar to perform the game of skill by operating at least one input mechanism;
   in response to a triggering event, determining a skill score based on at least one aspect of the avatar's performance in the game of skill and a set of game instructions stored in a memory of the gaming machine; and
   based on the skill score, determining a monetary reward to be awarded to the player from a prize pool.

32. The method of embodiment 31, further comprising presenting at least one game of chance on the display in response to receiving user input.

33. The method of embodiment 32, further comprising incrementing the prize pool based on player spend in the game of chance.

34. The method of embodiment 32 or 33, further comprising presenting the at least one game of skill after presenting the at least one game of chance.

35. The method of embodiment 34, further comprising presenting the at least one game of skill in response to at least one outcome of the at least one game of chance.

36. The method of any one of embodiments 32 to 35, further comprising executing a meta-game, wherein the meta-game defines at least one meta-game objective and wherein progression through the meta-game towards the at least one meta-game objective is related to results of the game of chance.

37. A computer-readable medium storing machine-readable instructions, which when executed by a processor, causes the processor to perform the method of any one of embodiments 31 to 36.

38. A gaming machine comprising:
   a display;
   a memory storing a set of game instructions;
   at least one input mechanism configured to receive user input from a player; and
   a game controller configured to access and execute the instructions stored in the memory to:
   present at least one game of skill on the display;
   enable a player to control an avatar to perform the game of skill by operating the at least one input mechanism;
   in response to a triggering event, determine a skill indicator based on at least one aspect of the avatar's performance in the game of skill and the set of game instructions; and based on the skill indicator, determine a monetary reward to be awarded to the player from a prize pool.

While the foregoing description has been provided by way of example of the preferred embodiments as presently contemplated, which utilise gaming machines of the type found in casinos, those skilled in the relevant arts will appreciate that described embodiments also may have application to internet gaming and/or have application to gaming over a telecommunications network, where mobile handsets are used to display game outcomes and receive player inputs. Such mobile devices include smart phones, notebooks, tablets, iPads and laptop computers. For instance free mobile device games may be offered for download and play on a player's personal mobile device as a bonus game play. In some embodiments, these downloads may be made available on a server accessible via an internet connection. In some embodiments, gaming machine 100/304 may comprise a communication interface to enable interaction and data transfer between the personal mobile devices and gaming machine 100/304, to allow downloads from gaming machine 100/304 to the personal mobile device. The communication interface may be a wireless interface in some embodiments.

Further embodiments may enable a player to upload the outcome of a game or bonus game to a social media site(s), post tournament scores etc.

Certain steps in the processes or process flows described in this disclosure naturally precede others for the embodiments to function as described. However, embodiments are not limited to the order of the steps described if such order or sequence does not alter the functionality of the described embodiments. That is, it is recognized that some steps may performed before, after, or parallel (substantially simultaneously with) other steps without departing from the scope and spirit of the present disclosure. In some instances, certain steps may be omitted or not performed. Further, words such as "thereafter", "then", "next", etc. are not intended to limit the order of the steps. These words are simply used to guide the reader through the description of the exemplary method.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any communication connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

The invention claimed is:

1. A computing system including a virtual environment hosting a player avatar comprising:

a display;
a memory storing a set of activity instructions;
at least one payout mechanism;
at least one tactile input mechanism configured to receive user input from a player, wherein the at least one tactile input mechanism is configured to translate physical motion to a relative position on the display; and
a controller configured to access and execute the set of activity instructions stored in the memory to:
randomly select a symbol sub-set for display on the display;
based on the randomly selected symbol sub-set, determine a game outcome for a game of chance;
based on the randomly selected symbol sub-set, determine a game progression outcome for a meta-game, wherein the meta-game defines at least one meta-game objective, and wherein a successful game progression outcome results in progression through the meta-game towards the at least one meta-game objective;
display the game outcome for the game of chance and the game progression outcome for the meta-game on the display, the game progression outcome for the meta-game being displayed at the same time as the game outcome for the game of chance;
generate a virtual environment; present a player avatar on the display within the virtual environment;
present at least one skill activity on the display, wherein at least one aspect of game play in the skill activity is affected by achievement of the at least one meta-game objective;
enable the player to control the player avatar to perform the skill activity in association with the virtual environment by operating the at least one tactile input mechanism;
in response to a triggering event, determine a skill score based on at least one aspect of a performance of the player avatar in the skill activity and the set of activity instructions;
based on the skill score, determine a monetary reward to be awarded to the player from a prize pool;
instruct the at least one payout mechanism to award the monetary reward to the player;
record at least one aesthetic attribute of the player avatar to a ticket, wherein the ticket is read by the computing system to load the at least one aesthetic attribute of the player avatar during a subsequent gaming session, and wherein the aesthetic attribute does not affect the performance of the player avatar in the skill activity; and
at the end of a gaming session, discard all ability attributes of the player avatar without recording the ability attributes to the ticket, wherein the ability attributes affect the performance of the player avatar in the skill activity;
wherein the monetary reward is determined based on a correlation between the skill score and a skill score range associated with the at least one prize pool.

2. The computing system of claim 1, wherein the controller is configured to present at least one chance activity on the display in response to receiving user input, and wherein the controller is configured to present the at least one skill activity in response to at least one outcome of the at least one chance activity.

3. A gaming machine comprising:
a display;
a memory storing a set of game instructions;
at least one payout mechanism;

at least one tactile input mechanism configured to receive user input from a player,
wherein the at least one tactile input mechanism is configured to translate physical motion to a relative position on the display for navigating through a game of skill; and
a game controller configured to access and execute the set of game instructions stored in the memory to:
randomly select a symbol sub-set for display on the display;
based on the randomly selected symbol sub-set, determine a game outcome for a game of chance;
based on the randomly selected symbol sub-set, determine a game progression outcome for a meta-game, wherein the meta-game defines at least one meta-game objective, and wherein a successful game progression outcome results in progression through the meta-game towards the at least one meta-game objective;
display the game outcome for the game of chance and the game progression outcome for the meta-game on the display, the game progression outcome for the meta-game being displayed at the same time as the game outcome for the game of chance;
present the game of skill on the display, the game of skill involving the application of player skill via the at least one tactile input mechanism, wherein at least one aspect of game play in the game of skill is affected by achievement of the at least one meta-game objective;
enable the player to control a player avatar to perform the game of skill by operating the at least one tactile user input mechanism;
in response to a triggering event, determine a skill score based on at least one aspect of a performance of the player avatar in the game of skill and the set of game instructions;
based on the skill score, determine a monetary reward to be awarded to the player from a prize pool;
instruct the at least one payout mechanism to award the monetary reward to the player;
record at least one aesthetic attribute of the player avatar to a ticket, wherein the ticket is read by the gaming machine to load the at least one aesthetic attribute of the player avatar during a subsequent gaming session, and wherein the aesthetic attribute does not affect the performance of the player avatar in the game of skill; and
at the end of a gaming session, discard all ability attributes of the player avatar without recording the ability attributes to the ticket, wherein the ability attributes affect the performance of the player avatar in the game of skill;
wherein the monetary reward is determined based on a correlation between the skill score and a skill score range associated with the prize pool.

4. The gaming machine of claim 3, wherein the prize pool is incremented based on player spend in the game of chance.

5. The gaming machine of claim 4, wherein the game controller is configured to present the game of skill in response to at least one outcome of the at least one game of chance.

6. The gaming machine of claim 3, wherein the game controller is configured to present the at least one game of skill in response to a pre-determined condition being met.

7. The gaming machine of claim 3, wherein the game controller is configured to randomly generate a return-to-player levelling event that causes the player who is playing at the time of the levelling event being generated to be awarded a pre-determined percentage of the prize pool associated with the game of skill; wherein the return-to-player levelling event is generated before play of the game of skill commences.

8. The gaming machine of claim 7, wherein the percentage is between 60% and 100%.

9. The gaming machine of claim 7, wherein the return-to-player levelling event causes a characteristic of the player avatar to change in favour of the player.

10. The gaming machine of claim 3, wherein the prize pool is divided into a plurality of prize pool segments, each prize pool segment being associated with a skill score range.

11. The gaming machine of claim 10, wherein the value of each prize pool segment is related to the skill score range associated with that prize pool segment.

12. The gaming machine of claim 10, wherein when a prize pool segment is won, that prize pool segment is reseeded with money from a secondary prize pool, and the associations between each prize pool and each skill score range are modified so that the monetary value of each prize pool segment is related to the skill score range associated with that prize pool segment.

13. The gaming machine of claim 3, wherein the monetary reward awarded to the player is a percentage of an amount of money in a prize pool, the game controller being configured to calculate the percentage based on the skill score.

14. The gaming machine of claim 13, wherein the skill score is determined based on actions of the avatar in the game of skill.

15. The gaming machine of claim 3, wherein the skill score is determined based at least in part on at least one of:
a number of in-game items collected by the player in the game of skill;
a number of in-game opponents defeated by the player in the game of skill;
a time in which the player completes a task in the game of skill;
a difficulty of an action sequence executed by the player in the game of skill;
an amount of damage inflicted upon an opponent by the player in the game of skill;
the use of in-game consumables by the player in the game of skill; and
an amount of damage inflicted upon the player in the game of skill.

16. The gaming machine of claim 3, wherein the triggering event is at least one of an action or achievement of the player avatar during game play, and completion of a feature game.

17. A method of determining a monetary reward based on an outcome of a game of skill, the method comprising:
randomly selecting a symbol sub-set for display on at least one display;
based on the randomly selected symbol sub-set, determining a game outcome for a game of chance;
based on the randomly selected symbol sub-set, determining a game progression outcome for a meta-game, wherein the meta-game defines at least one meta-game objective, and wherein a successful game progression outcome results in progression through the meta-game towards the at least one meta-game objective;
displaying the game outcome for the game of chance and the game progression outcome for the meta-game on the at least one display, the game progression outcome for the meta-game being displayed at the same time as the game outcome for the game of chance;

presenting at least one game of skill on the at least one display of a gaming machine, the game of skill involving the application of player skill via at least one tactile user input mechanism, wherein at least one aspect of game play in the game of skill is affected by achievement of the at least one meta-game objective;

enabling a player to control an avatar to perform the game of skill by operating the at least one tactile user input mechanism;

in response to a triggering event, determining a skill score based on at least one aspect of a performance of the avatar in the game of skill and a set of game instructions stored in a memory of the gaming machine;

based on the skill score, determining a monetary reward to be awarded to the player from a prize pool;

instructing a payout mechanism of the gaming machine to award the monetary reward to the player;

recording at least one aesthetic attribute of the avatar to a ticket, wherein the ticket is read by the gaming machine to load the at least one aesthetic attribute of the avatar during a subsequent gaming session, and wherein the aesthetic attribute does not affect the performance of the avatar in the game of skill; and at the end of a gaming session, discard all ability attributes of the avatar without recording the ability attributes to the ticket, wherein the ability attributes affect the performance of the avatar in the game of skill;

wherein the monetary reward is determined based on a correlation between the skill score and a skill score range associated with the prize pool.

18. A non-transitory, computer-readable medium storing machine-readable instructions, which when executed by a processor, causes the processor to perform the method of claim 17.

* * * * *